United States Patent
Russell

(10) Patent No.: US 11,751,056 B2
(45) Date of Patent: Sep. 5, 2023

(54) METHODS, SYSTEMS, AND COMPUTER READABLE MEDIA FOR 5G USER EQUIPMENT (UE) HISTORICAL MOBILITY TRACKING AND SECURITY SCREENING USING MOBILITY PATTERNS

(71) Applicant: Oracle International Corporation, Redwood Shores, CA (US)

(72) Inventor: Travis Earl Russell, Clayton, NC (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 202 days.

(21) Appl. No.: 17/008,528

(22) Filed: Aug. 31, 2020

(65) Prior Publication Data
US 2022/0070674 A1 Mar. 3, 2022

(51) Int. Cl.
*H04L 29/06* (2006.01)
*H04W 12/12* (2021.01)
(Continued)

(52) U.S. Cl.
CPC ....... *H04W 12/122* (2021.01); *H04L 63/0281* (2013.01); *H04W 4/029* (2018.02);
(Continued)

(58) Field of Classification Search
CPC ..... H04W 12/63; H04W 12/80; H04W 4/029; H04W 72/04; H04W 60/00; H04W 12/61;
(Continued)

(56) References Cited

U.S. PATENT DOCUMENTS 6,091,958 A 7/2000 Bergkvist et al.
6,151,503 A 11/2000 Chavez
(Continued)

FOREIGN PATENT DOCUMENTS

CN 101277541 A 10/2008
CN 10135561 A 1/2009
(Continued)

OTHER PUBLICATIONS

F5G, System (5GS) to support network data analytics services (3GPP TS 23.288 version 16.4.0 Release 16); Jul. 2020; pp. 1-67.*
(Continued)

*Primary Examiner* — Mohammad A Siddiqi
(74) *Attorney, Agent, or Firm* — Jenkins, Taylor & Hunt, P.A.

(57) ABSTRACT

A method for historical 5G user equipment (UE) mobility tracking and security screening includes receiving, at a network data aggregation node including at least one processor, UE registration data from 5G network functions (NFs) as UEs connect to different network locations. The method further includes aggregating, at the network node, registration data for individual UEs from the 5G NFs to produce mobility patterns for the UEs. The method further includes receiving, at the network node and from a 5G NF located in a home network of a UE, a request for a mobility pattern of the UE in response to receiving a message for effecting a new registration for the UE. The method further includes responding to the request by transmitting the mobility pattern to the 5G NF located in the home network of the UE.

10 Claims, 10 Drawing Sheets

(51) Int. Cl.
  *H04W 60/00* (2009.01)
  *H04W 4/029* (2018.01)
  *H04W 72/04* (2023.01)
  *H04W 12/122* (2021.01)
  *H04L 9/40* (2022.01)
  *H04W 84/04* (2009.01)

(52) U.S. Cl.
  CPC ........... *H04W 60/00* (2013.01); *H04W 72/04* (2013.01); *H04W 84/042* (2013.01)

(58) Field of Classification Search
  CPC .............. H04W 12/122; H04W 84/042; H04L 63/0281
  See application file for complete search history.

(56) References Cited

U.S. PATENT DOCUMENTS

| | | |
|---|---|---|
| 6,292,666 B1 | 9/2001 | Siddiqui et al. |
| 6,308,075 B1 | 10/2001 | Irten et al. |
| 6,343,215 B1 | 1/2002 | Calabrese et al. |
| 6,591,101 B1 | 7/2003 | Shimbori |
| 7,043,754 B2 | 5/2006 | Arnouse |
| 7,567,661 B1 | 7/2009 | Wood et al. |
| 8,045,956 B2 | 10/2011 | Sun et al. |
| 8,145,234 B1 | 3/2012 | Leonard et al. |
| 8,509,074 B1 | 8/2013 | Roberts et al. |
| 8,615,217 B2 | 12/2013 | Ravishankar et al. |
| 8,846,605 B2 * | 9/2014 | Ghatnekar ............. A61P 43/00 514/18.6 |
| 8,879,431 B2 | 11/2014 | Ridel et al. |
| 9,015,808 B1 | 4/2015 | Koller et al. |
| 9,060,263 B1 | 6/2015 | Carames et al. |
| 9,106,428 B2 | 8/2015 | Matthews et al. |
| 9,106,769 B2 | 8/2015 | Kanode et al. |
| 9,191,803 B2 | 11/2015 | Patel et al. |
| 9,240,946 B2 | 1/2016 | Cai et al. |
| 9,374,840 B2 | 6/2016 | Monedero Recuero |
| 9,538,335 B1 | 1/2017 | Bank et al. |
| 9,628,994 B1 | 4/2017 | Gunyel et al. |
| 9,681,360 B1 | 6/2017 | Salyers et al. |
| 9,912,486 B1 | 3/2018 | Sharifi Mehr |
| 10,009,751 B2 | 6/2018 | Gundavelli et al. |
| 10,021,738 B1 | 7/2018 | Mehta et al. |
| 10,045,326 B2 | 8/2018 | Blanchard et al. |
| 10,168,413 B2 | 1/2019 | Annamalai et al. |
| 10,212,538 B2 | 2/2019 | Russell |
| 10,230,726 B2 | 3/2019 | Barkan |
| 10,237,721 B2 | 3/2019 | Gupta et al. |
| 10,306,459 B1 | 5/2019 | Patil et al. |
| 10,470,154 B2 | 11/2019 | Chellamani et al. |
| 10,511,998 B1 | 12/2019 | Vallur |
| 10,616,200 B2 | 4/2020 | Kumar et al. |
| 10,637,838 B1 | 4/2020 | Larios et al. |
| 10,652,850 B2 | 5/2020 | Landais et al. |
| 10,776,791 B2 | 9/2020 | Ferguson et al. |
| 10,834,045 B2 | 11/2020 | Mahalank et al. |
| 10,834,571 B1 | 11/2020 | Yau et al. |
| 10,931,668 B2 | 2/2021 | Mehta |
| 10,952,063 B2 | 3/2021 | Mehta |
| 10,984,128 B1 | 4/2021 | Hoffer |
| 11,050,788 B2 | 6/2021 | Livanos |
| 11,068,534 B1 | 7/2021 | Svendsen |
| 11,140,555 B2 | 10/2021 | Thai et al. |
| 11,265,695 B2 | 3/2022 | Shah et al. |
| 11,272,560 B1 | 3/2022 | Vivanco et al. |
| 11,368,839 B2 | 6/2022 | Targali |
| 11,411,925 B2 | 8/2022 | Kumar et al. |
| 11,516,671 B2 | 11/2022 | Rajput et al. |
| 11,528,251 B2 | 12/2022 | Rajput et al. |
| 2001/0046856 A1 | 11/2001 | McCann |
| 2002/0080752 A1 | 6/2002 | Johansson et al. |
| 2002/0098856 A1 | 7/2002 | Berg et al. |
| 2002/0181448 A1 | 12/2002 | Uskela et al. |
| 2002/0193127 A1 | 12/2002 | Martschitsch |
| 2003/0087647 A1 | 5/2003 | Hurst |
| 2004/0140908 A1 | 7/2004 | Gladwin et al. |
| 2005/0182968 A1 | 8/2005 | Izatt et al. |
| 2005/0232236 A1 | 10/2005 | Allison et al. |
| 2006/0068762 A1 | 3/2006 | Baldwin et al. |
| 2006/0193258 A1 | 8/2006 | Ballai |
| 2006/0211406 A1 | 9/2006 | Szucs et al. |
| 2006/0242414 A1 | 10/2006 | Corson et al. |
| 2007/0011261 A1 | 1/2007 | Madams et al. |
| 2007/0165527 A1 | 7/2007 | Sultan et al. |
| 2007/0165626 A1 | 7/2007 | Sultan et al. |
| 2007/0174082 A1 | 7/2007 | Singh |
| 2007/0223372 A1 | 9/2007 | Haalen et al. |
| 2007/0248032 A1 | 10/2007 | Vasudevan et al. |
| 2007/0281718 A1 | 12/2007 | Nooren |
| 2008/0004047 A1 | 1/2008 | Hill et al. |
| 2008/0020704 A1 | 1/2008 | Costa |
| 2008/0026778 A1 | 1/2008 | Cai et al. |
| 2008/0045246 A1 | 2/2008 | Murtagh et al. |
| 2008/0051061 A1 | 2/2008 | Takahashi |
| 2008/0076430 A1 | 3/2008 | Olson et al. |
| 2008/0125116 A1 | 5/2008 | Jiang |
| 2008/0168540 A1 | 7/2008 | Agarwal et al. |
| 2008/0207181 A1 | 8/2008 | Jiang |
| 2008/0222038 A1 | 9/2008 | Eden |
| 2008/0259798 A1 | 10/2008 | Loh et al. |
| 2009/0045251 A1 | 2/2009 | Jaiswal et al. |
| 2009/0168719 A1 | 7/2009 | Mercurio |
| 2009/0191915 A1 | 7/2009 | Abramson et al. |
| 2009/0195349 A1 | 8/2009 | Frader-Thompson et al. |
| 2010/0062789 A1 | 3/2010 | Agarwal et al. |
| 2010/0098414 A1 | 4/2010 | Kramer et al. |
| 2010/0100958 A1 | 4/2010 | Jeremiah et al. |
| 2010/0105355 A1 | 4/2010 | Nooren |
| 2010/0130227 A1 | 5/2010 | Farthofer et al. |
| 2010/0161817 A1 | 6/2010 | Xiao et al. |
| 2010/0223222 A1 | 9/2010 | Zhou et al. |
| 2010/0235911 A1 | 9/2010 | Nooren |
| 2010/0240361 A1 | 9/2010 | Jiang |
| 2010/0313024 A1 | 12/2010 | Weniger et al. |
| 2011/0009085 A1 | 1/2011 | Albanes et al. |
| 2011/0014939 A1 | 1/2011 | Ravishankar et al. |
| 2011/0029655 A1 | 2/2011 | Forbes, Jr. et al. |
| 2011/0063126 A1 | 3/2011 | Kennedy et al. |
| 2011/0124317 A1 | 5/2011 | Joo |
| 2011/0124334 A1 | 5/2011 | Brisebois et al. |
| 2011/0158090 A1 | 6/2011 | Riley et al. |
| 2011/0173122 A1 | 7/2011 | Singhal |
| 2011/0191835 A1 | 8/2011 | Hawkes et al. |
| 2011/0217979 A1 | 9/2011 | Nas |
| 2011/0225091 A1 | 9/2011 | Plastina et al. |
| 2011/0246178 A1 | 10/2011 | Arzelier |
| 2011/0307381 A1 | 12/2011 | Kim et al. |
| 2012/0099715 A1 | 4/2012 | Ravishankar et al. |
| 2012/0110637 A1 | 5/2012 | Holtmanns et al. |
| 2012/0115512 A1 | 5/2012 | Grainger et al. |
| 2012/0131121 A1 | 5/2012 | Snyder et al. |
| 2012/0202481 A1 | 8/2012 | Martin |
| 2012/0203663 A1 | 8/2012 | Sinclair et al. |
| 2012/0207015 A1 | 8/2012 | Marsico |
| 2013/0035118 A1 | 2/2013 | Hamano et al. |
| 2013/0102231 A1 | 4/2013 | Joseph et al. |
| 2013/0102310 A1 | 4/2013 | Malonda |
| 2013/0171988 A1 | 7/2013 | Yeung et al. |
| 2013/0276035 A1 | 10/2013 | Walker et al. |
| 2013/0331063 A1 | 12/2013 | Cormier et al. |
| 2014/0195630 A1 | 7/2014 | Malik et al. |
| 2014/0199961 A1 | 7/2014 | Mohammed et al. |
| 2014/0199996 A1 | 7/2014 | Wang et al. |
| 2014/0259012 A1 | 9/2014 | Nandlall et al. |
| 2014/0280645 A1 | 9/2014 | Shuman et al. |
| 2014/0370922 A1 | 12/2014 | Richards |
| 2014/0378129 A1 | 12/2014 | Jiang et al. |
| 2015/0012415 A1 | 1/2015 | Livne et al. |
| 2015/0038156 A1 | 2/2015 | Kilpatrick, II et al. |
| 2015/0081579 A1 | 3/2015 | Brown et al. |
| 2015/0094060 A1 | 4/2015 | Kouridakis et al. |
| 2015/0119092 A1 | 4/2015 | Yi et al. |
| 2015/0121078 A1 | 4/2015 | Fu et al. |

(56) References Cited

U.S. PATENT DOCUMENTS

| | | |
|---|---|---|
| 2015/0188979 A1 | 7/2015 | Almeras et al. |
| 2015/0244486 A1 | 8/2015 | Liang et al. |
| 2015/0304220 A1 | 10/2015 | Miyao |
| 2015/0304803 A1 | 10/2015 | Chen et al. |
| 2015/0341341 A1 | 11/2015 | Messerges |
| 2015/0350196 A1 | 12/2015 | Toyonaga et al. |
| 2016/0088461 A1 | 3/2016 | Jiang |
| 2016/0119773 A1 | 4/2016 | Xu et al. |
| 2016/0156647 A1 | 6/2016 | Engel et al. |
| 2016/0165432 A1 | 6/2016 | Dubesset et al. |
| 2016/0183117 A1 | 6/2016 | Hsu et al. |
| 2016/0183178 A1 | 6/2016 | Marimuthu |
| 2016/0219043 A1 | 7/2016 | Blanke |
| 2016/0234119 A1 | 8/2016 | Zaidi et al. |
| 2016/0269566 A1 | 9/2016 | Gundamaraju et al. |
| 2016/0292687 A1 | 10/2016 | Kruglick |
| 2016/0337976 A1 | 11/2016 | Wang et al. |
| 2016/0365983 A1 | 12/2016 | Shahabuddin et al. |
| 2016/0381699 A1 | 12/2016 | Rubin et al. |
| 2017/0006431 A1 | 1/2017 | Donovan et al. |
| 2017/0142547 A1 | 5/2017 | Hou et al. |
| 2017/0201778 A1 | 7/2017 | Bailey et al. |
| 2017/0244676 A1 | 8/2017 | Edwards |
| 2017/0245207 A1 | 8/2017 | Stammers et al. |
| 2017/0257866 A1 | 9/2017 | Chaudhuri et al. |
| 2017/0272921 A1 | 9/2017 | Kim et al. |
| 2017/0289048 A1 | 10/2017 | Chao et al. |
| 2017/0295201 A1 | 10/2017 | Peylo et al. |
| 2017/0345006 A1 | 11/2017 | Kohli |
| 2017/0366499 A1 | 12/2017 | De Boer et al. |
| 2018/0020324 A1 | 1/2018 | Beauford |
| 2018/0109632 A1 | 4/2018 | Stammers et al. |
| 2018/0109953 A1 | 4/2018 | He |
| 2018/0115970 A1 | 4/2018 | Chae et al. |
| 2018/0167906 A1 | 6/2018 | Chellamani et al. |
| 2018/0205698 A1 | 7/2018 | Gupta et al. |
| 2018/0220301 A1 | 8/2018 | Gallagher et al. |
| 2018/0270765 A1 | 9/2018 | Wang |
| 2018/0288127 A1 | 10/2018 | Zaidi et al. |
| 2018/0288198 A1 | 10/2018 | Pope et al. |
| 2018/0310162 A1 | 10/2018 | Kim et al. |
| 2019/0007788 A1* | 1/2019 | Russell .............. H04W 4/02 |
| 2019/0037484 A1 | 1/2019 | Davies et al. |
| 2019/0044932 A1 | 2/2019 | Kumar et al. |
| 2019/0074982 A1 | 3/2019 | Hughes |
| 2019/0090086 A1 | 3/2019 | Graham et al. |
| 2019/0104982 A1* | 4/2019 | Dunn .............. A61B 5/0531 |
| 2019/0116624 A1 | 4/2019 | Tandon et al. |
| 2019/0174449 A1* | 6/2019 | Shan .............. H04W 60/00 |
| 2019/0182875 A1 | 6/2019 | Talebi Fard et al. |
| 2019/0253885 A1 | 8/2019 | Bykampadi et al. |
| 2019/0306166 A1 | 10/2019 | Konda et al. |
| 2019/0342217 A1 | 11/2019 | Mazurek |
| 2019/0354709 A1 | 11/2019 | Brinskelle |
| 2019/0364064 A1 | 11/2019 | Gupta et al. |
| 2019/0364460 A1 | 11/2019 | Bogineni et al. |
| 2020/0007538 A1 | 1/2020 | Mehta |
| 2020/0036754 A1 | 1/2020 | Livanos |
| 2020/0042799 A1 | 2/2020 | Huang et al. |
| 2020/0053044 A1 | 2/2020 | Mahalank et al. |
| 2020/0077260 A1 | 3/2020 | Hancock et al. |
| 2020/0107291 A1 | 4/2020 | Nayak et al. |
| 2020/0145432 A1 | 5/2020 | Verma et al. |
| 2020/0169510 A1 | 5/2020 | Kadosh et al. |
| 2020/0187089 A1 | 6/2020 | Meredith et al. |
| 2020/0221541 A1 | 7/2020 | Yan |
| 2020/0259896 A1 | 8/2020 | Sachs et al. |
| 2020/0296606 A1* | 9/2020 | Mendoza .............. H04W 24/04 |
| 2020/0329363 A1 | 10/2020 | Mehta |
| 2020/0344604 A1 | 10/2020 | He et al. |
| 2020/0359218 A1 | 11/2020 | Lee et al. |
| 2020/0404490 A1 | 12/2020 | Thai et al. |
| 2021/0022070 A1 | 1/2021 | Letor et al. |
| 2021/0111985 A1 | 4/2021 | Mahalank et al. |
| 2021/0112012 A1 | 4/2021 | Krishan et al. |
| 2021/0142143 A1 | 5/2021 | Howard |
| 2021/0152494 A1 | 5/2021 | Johnsen et al. |
| 2021/0168751 A1 | 6/2021 | Stojanovski et al. |
| 2021/0176177 A1 | 6/2021 | Kubo et al. |
| 2021/0194903 A1 | 6/2021 | Medvedovsky et al. |
| 2021/0203636 A1 | 7/2021 | Kumar et al. |
| 2021/0203643 A1* | 7/2021 | Jost .............. H04W 12/02 |
| 2021/0211946 A1 | 7/2021 | Li |
| 2021/0234706 A1 | 7/2021 | Nair et al. |
| 2021/0243165 A1 | 8/2021 | Bykampadi et al. |
| 2021/0250186 A1 | 8/2021 | Bykampadi et al. |
| 2021/0258824 A1 | 8/2021 | John et al. |
| 2021/0274436 A1 | 9/2021 | Sun et al. |
| 2021/0297942 A1 | 9/2021 | Bykampadi et al. |
| 2021/0321303 A1 | 10/2021 | Nair et al. |
| 2021/0360393 A1* | 11/2021 | Nair .............. H04W 12/106 |
| 2021/0377138 A1 | 12/2021 | Sun et al. |
| 2021/0377212 A1 | 12/2021 | Holtmanns et al. |
| 2021/0399988 A1 | 12/2021 | Labonte |
| 2021/0400538 A1 | 12/2021 | Ke |
| 2021/0406038 A1 | 12/2021 | Fetzer et al. |
| 2022/0021586 A1 | 1/2022 | Kazmierski |
| 2022/0022027 A1 | 1/2022 | Xin et al. |
| 2022/0022040 A1 | 1/2022 | Mahalank et al. |
| 2022/0030413 A1 | 1/2022 | Ben Henda et al. |
| 2022/0038394 A1 | 2/2022 | Anubolu et al. |
| 2022/0052847 A1 | 2/2022 | Gonzalez Cervantes et al. |
| 2022/0086607 A1* | 3/2022 | Ali .............. H04W 4/40 |
| 2022/0104020 A1 | 3/2022 | Rajput |
| 2022/0104112 A1 | 3/2022 | Rajput |
| 2022/0124079 A1 | 4/2022 | Patil et al. |
| 2022/0124479 A1 | 4/2022 | Iddya |
| 2022/0124501 A1 | 4/2022 | Bykampadi et al. |
| 2022/0150212 A1 | 5/2022 | Rajput et al. |
| 2022/0158847 A1 | 5/2022 | Aggarwal et al. |
| 2022/0159445 A1 | 5/2022 | Rajavelu et al. |
| 2022/0174544 A1 | 6/2022 | Taft et al. |
| 2022/0182923 A1 | 6/2022 | Yao et al. |
| 2022/0191694 A1 | 6/2022 | Rajput |
| 2022/0191763 A1 | 6/2022 | Roeland et al. |
| 2022/0200951 A1 | 6/2022 | Goel |
| 2022/0200966 A1 | 6/2022 | De-Gregorio-Rodriguez et al. |
| 2022/0201489 A1 | 6/2022 | Mahalank |
| 2022/0240084 A1 | 7/2022 | Speidel et al. |
| 2022/0264260 A1 | 8/2022 | Chaurasia et al. |
| 2022/0272069 A1 | 8/2022 | Verma et al. |
| 2022/0272541 A1 | 8/2022 | Rajput et al. |
| 2022/0369091 A1 | 11/2022 | Nair |

FOREIGN PATENT DOCUMENTS

| | | |
|---|---|---|
| CN | 101742445 A | 6/2010 |
| CN | 101917698 A | 12/2010 |
| CN | 102656845 A | 9/2012 |
| CN | 103179504 A | 6/2013 |
| CN | 103444212 A | 12/2013 |
| CN | 107800664 A | 3/2018 |
| CN | 110035433 A | 7/2019 |
| CN | 110800322 B | 5/2021 |
| CN | 201880040478.3 | 4/2022 |
| CN | 202080007649.X | 9/2022 |
| EP | 1 067 492 A2 | 1/2001 |
| EP | 1 906 682 A1 | 4/2008 |
| EP | 2 204 955 A1 | 7/2010 |
| EP | 2 785 125 B1 | 8/2018 |
| EP | 3 493 569 A1 | 6/2019 |
| EP | 3 646 630 B1 | 8/2021 |
| EP | 3 662 630 | 8/2021 |
| EP | 3954146 A1 | 2/2022 |
| EP | 3 821 630 B1 | 7/2022 |
| ES | 2 548 005 T3 | 10/2015 |
| GB | 2503973 A | 1/2014 |
| IN | 401247 | 7/2018 |
| JP | 2008-053808 A | 3/2008 |
| JP | 7038148 B2 | 3/2022 |
| JP | 7113147 | 8/2022 |
| JP | 7113147 B | 8/2022 |
| JP | 7133010 | 9/2022 |
| JP | 7133010 B2 | 9/2022 |

(56) References Cited

FOREIGN PATENT DOCUMENTS

| | | |
|---|---|---|
| JP | 7198339 B | 12/2022 |
| KR | 20180069737 A | 6/2018 |
| WO | WO 01/88790 A1 | 11/2001 |
| WO | WO 2005/091656 A1 | 9/2005 |
| WO | WO 2005/101872 A1 | 10/2005 |
| WO | WO 2007/084503 A2 | 7/2007 |
| WO | WO 2008/053808 A1 | 5/2008 |
| WO | WO-2010/021886 A1 | 2/2010 |
| WO | WO 2010/045646 A2 | 4/2010 |
| WO | WO 2010/105099 A2 | 9/2010 |
| WO | WO 2011/010640 A1 | 1/2011 |
| WO | WO 2011/047382 A2 | 4/2011 |
| WO | WO 2016/201990 A1 | 12/2016 |
| WO | WO 2017/082532 A1 | 5/2017 |
| WO | WO 2019/158028 A1 | 8/2018 |
| WO | WO 2018/202284 A1 | 11/2018 |
| WO | WO 2019/005287 A1 | 1/2019 |
| WO | WO 2019/027813 A1 | 2/2019 |
| WO | WO 2019/224157 A1 | 11/2019 |
| WO | WO 2020/013889 A1 | 1/2020 |
| WO | WO 2020/033113 A1 | 2/2020 |
| WO | WO 2020/036883 A1 | 2/2020 |
| WO | WO 2020/164763 A1 | 8/2020 |
| WO | WO 2020/174121 A1 | 9/2020 |
| WO | WO 2020/179665 A1 | 9/2020 |
| WO | WO 2020/210015 A1 | 10/2020 |
| WO | WO 2020/257018 A1 | 12/2020 |
| WO | WO 2021/138072 A1 | 7/2021 |
| WO | WO 2022/015378 A1 | 1/2022 |
| WO | WO 2022/046176 A1 | 3/2022 |
| WO | WO 2022/066227 | 3/2022 |
| WO | WO 2022/066228 A1 | 3/2022 |
| WO | WO 2022/086596 A1 | 4/2022 |
| WO | WO 2022/098404 A1 | 5/2022 |
| WO | WO 2022/103454 A1 | 5/2022 |
| WO | WO 2022/132315 A1 | 6/2022 |
| WO | WO 2022/132316 A1 | 6/2022 |
| WO | WO 2022/182448 A1 | 9/2022 |
| WO | WO 2022/240582 A1 | 11/2022 |

OTHER PUBLICATIONS

Notice of Allowance and Fee(s) Due and Examiner-Initiated Interview Summary for U.S. Appl. No. 16/100,172 (dated Sep. 14, 2020).

First Office Action for Chinese Application Serial No. 201880040477.9 (dated Aug. 5, 2020).

Notification of Transmittal of the International Search Report and the Written Opinion of the International Searching Authority, or the Declaration for International Application No. PCT/US2020/024234 (dated Jul. 16, 2020).

Non-Final Office Action for U.S. Appl. No. 16/379,488 (dated Jul. 15, 2020).

Commonly-Assigned, co-pending U.S. Appl. No. 16/929,048 for "Methods, Systems, and Computer Readable Media for Mitigating 5G Roaming Security Attacks Using Security Edge Protection Proxy (SEPP)," (Unpublished, filed Jul. 14, 2020).

Non-Final Office Action for U.S. Appl. No. 16/024,422 (dated Jul. 8, 2020).

Applicant-Initiated Interview Summary for U.S. Appl. No. 16/100,172 (dated Jun. 9, 2020).

Communication of European publication No. and information on the application of Article 67(3) EPC for European Application Serial No. 18731923.1 (Apr. 8, 2020).

"3rd Generation Partnership Project; Technical Specification Group Services and System Aspects; Security architecture and procedures for 5G system (Release 16)," 3GPP TS 33.501, V16.2.0, pp. 1-227 (Mar. 2020).

Non-Final Office Action for U.S. Appl. No. 16/100,172 (dated Mar. 6, 2020).

Notice of Allowance and Fee(s) Due and Examiner-Initiated Interview Summary for U.S. Appl. No. 15/666,300 (dated Feb. 13, 2020).

Commonly-assigned, co-pending U.S. Appl. No. 16/732,098 for "Methods, Systems, and Computer Readable Media for Implementing Indirect General Packet Radio Service (GPRS) Tunneling Protocol (GTP) Firewall Filtering Using Diameter Agent and Signal Transfer Point (STP)," (Unpublished, filed Dec. 31, 2019).

Advisory Action and Applicant-Initiated Interview Summary for U.S. Appl. No. 16/100,172 (dated Dec. 20, 2019).

"3rd Generation Partnership Project; Technical Specification Group Services and System Aspects; 5G Security Assurance Specification (SCAS) for the Security Edge Protection Proxy (SEPP) network product class (Release 16)," 3GPP TS 33.517, V.16.1.0, pp. 1-17 (Dec. 2019).

"FS.19 Diameter Interconnect Security," GSMA, pp. 1-3 (Dec. 20, 2019).

Notification of Transmittal of the International Search Report and the Written Opinion of the International Searching Authority, or the Declaration for International Application Serial No. PCT/US2019/042203 (dated Nov. 11, 2019).

Applicant-Initiated Interview Summary for U.S. Appl. No. 15/666,300 (dated Oct. 29, 2019).

Final Office Action for U.S. Appl. No. 16/100,172 (dated Oct. 3, 2019).

"Technical Specification Group Core Network and Terminals; Evolved Packet System (EPS); Mobility Management Entity (MME) and Serving GPRS Support Node (SGSN) related interfaces based on Diameter protocol (Release 16)," 3GPP TS 29.272, V16.0.0, pp. 1-180 (Sep. 2019).

"Technical Specification Group Core Network and Terminals; Policy and Charging Control (PCC); Reference points (Release 16)," 3GPP TS 29.212, V16.1.0, pp. 1-285 (Sep. 2019).

Notification of Transmittal of the International Search Report and the Written Opinion of the International Searching Authority, or the Declaration for International Application Serial No. PCT/US2019/028814 (dated Aug. 20, 2019).

Applicant-Initiated Interview Summary for U.S. Appl. No. 16/100,172 (dated Jul. 18, 2019).

Notice of Allowance and Fee(s) Due and Examiner-Initiated Interview Summary for U.S. Appl. No. 15/376,631 (dated Jul. 2, 2019).

"Technical Specification Group Core Network and Terminals; Mobile Application Part (MAP) specification (Release 15)," 3GPP TS 29.002, V15.5.0, pp. 1-1024 (Jun. 2019).

Non-Final Office Action for U.S. Appl. No. 15/666,300 (dated Jun. 27, 2019).

Decision on Appeal for U.S. Appl. No. 13/047,287 (Jun. 18, 2019).

Notification of Transmittal of the International Search Report and the Written Opinion of the International Searching Authority, or the Declaration for International Patent Application No. PCT/US2019/018990 (dated May 8, 2019).

Commonly-Assigned, co-pending U.S. Appl. No. 16/379,488 for "Methods, Systems, and Computer Readable Media for Dynamically Learning and Using Foreign Telecommunications Network Mobility Management Node Information for Security Screening," (Unpublished, filed Apr. 9, 2019).

Non-Final Office Action for U.S. Appl. No. 16/100,172 (dated Apr. 11, 2019).

Notice of Allowability for U.S. Appl. No. 16/035,008 (dated Mar. 18, 2019).

Notice of Allowance and Fee(s) Due for U.S. Appl. No. 16/035,008 (dated Jan. 18, 2019).

Advisory Action Before the Filing of an Appeal Brief and AFCP 2.0 Decision for U.S. Appl. No. 15/376,631 (dated Dec. 19, 2018).

Notice of Allowance and Fee(s) Due and Applicant-Initiated Interview Summary for U.S. Appl. No. 15/408,155 (dated Oct. 31, 2018).

Notification of Transmittal of the International Search Report and the Written Opinion of the International Searching Authority, or the Declaration for International Patent Application No. PCT/US2018/043985 (dated Oct. 9, 2018).

Final Office Action for U.S. Appl. No. 15/376,631 (dated Oct. 5, 2018).

Notice of Allowance and Fee(s) Due for U.S. Appl. No. 15/636,118 (dated Oct. 3, 2018).

(56) References Cited

OTHER PUBLICATIONS

Notification of Transmittal of the International Search Report and the Written Opinion of the International Searching Authority, or the Declaration for International Application No. PCT/US2018/030319 (dated Aug. 20, 2018).
Final Office Action for U.S. Appl. No. 15/408,155 (dated Jul. 26, 2018).
Notice of Allowance and Fee(s) Due for U.S. Appl. No. 15/636,118 (dated Apr. 27, 2018).
Non-Final Office Action for U.S. Appl. No. 15/376,631 (dated Apr. 18, 2018).
"Signalling Security in Telecom SS7/Diameter/5G," Enisa, pp. 1-30 (Mar. 2018).
Examiner's Answer for U.S. Appl. No. 13/047,287 (dated Feb. 26, 2018).
Advisory Action Before the Filing of an Appeal Brief and AFCP 2.0 Decision for U.S. Appl. No. 15/376,631 (dated Feb. 2, 2018).
Non-Final Office Action for U.S. Appl. No. 15/408,155 (dated Jan. 9, 2018).
Final Office Action for U.S. Appl. No. 15/376,631 (dated Nov. 28, 2017).
"GSMA Guidelines for Diameter Firewall," NetNumber Inc., pp. 1-7 (Sep. 12, 2017).
"Oracle Communications Diameter Signaling Router Main Differentiators," Oracle White Paper, pp. 1-10 (Jul. 2017).
"LTE and EPC Roaming Guidelines," GSM Association, Official Document IR.88, V 16.0, pp. 1-90 (Jul. 5, 2017).
Non-Final Office Action for U.S. Appl. No. 15/376,631 (dated Jun. 16, 2017).
"LTE International Roaming Whitepaper," http://carrier.huawei.com/en/technical-topics/core-network/lte-roaming-whitepaper, pp. 1-16 (Downloaded May 12, 2017).
"Digital cellular telecommunications system (Phase 2+) (GSM); Universal Mobile Telecommunications System (UMTS); Universal Geographical Area Description (Gad) (3GPP TS 23.032 V 14.0.0 Release 14)," ETSI TS 123 032 V14.0.0, pp. 1-30 (May 2017).
Final Office Action for U.S. Appl. No. 13/047,287 (dated Mar. 10, 2017).
"3rd Generation Partnership Project; Technical Specification Group Services and System Aspects; Functional stage 2 description of Location Services (LCS) (Release 14)," 3GPP TS 23.271 V14.1.0, pp. 1-181 (Mar. 2017).
"Digital cellular telecommunications system (Phase 2+) (GSM); Universal Mobile Telecommunications System (UMTS); LTE; Cx and Dx interfaces based on the Diameter protocol; Protocol details (3GPP TS 29.229 V 13.1.0 Release 13)," ETSI TS 129 229 V13.1.0, pp. 1-42 (Jan. 2017).
"Edge Router (DEA)," http://www.mavenir.com/our-products/mobile/edge-router-dea, pp. 1-7 (Copyright 2017).
Non-Final Office Action for U.S. Appl. No. 13/047,287 (dated Aug. 25, 2016).
"Digital cellular telecommunications system (Phase 2+); Universal Mobile Telecommunications System (UMTS); Numbering, addressing and identification (3GPP TS 23.003 V 12.9.0 Release 12)," ETSI TS 1 23 003 V12.9.0, pp. 1-93 (Mar. 2016).
"Syniverse Guide to LTE Roaming and Interoperability," https://www.syniverse.com/assets/files/custom_content/lte-roaming-interoperability-guide.pdf, pp. 1-11 (Jan. 8, 2016).
"Digital cellular telecommunications system (Phase 2+) (GSM); Universal Mobile Telecommunications System (UMTS); LTE; Location Services (LCS); LCS Application Protocol (LCS-AP) between the Mobile Management Entity (MME) and Evolved Serving Mobile Location Centre (E-SMLC); SLS interface (3GPP TS 29.171 V 11.4.0 Release 11)," ETSI TS 129 171 V11.4.0, pp. 1-52 (Jan. 2016).
"Diameter Signaling Control (DSC)," https://www.extent.com/diameter-signaling-control-dsc/, pp. 1-3 (Copyright 2016).
Kotte, "Analysis and Experimental Verification of Diameter Attacks in Long Term Evolution Networks," http://www.diva-portal.org/smash/get/diva2:951619/FULLTEXT01.pdf, pp. 1-72 (2016).
Advisory Action Before the Filing of an Appeal Brief for U.S. Appl. No. 13/047,287 (dated Oct. 16, 2015).
"The Dialogic® Helix™ Signaling Controller," https://www.dialogic.com/-/media/products/docs/brochures/14090-helix-br.pdf, pp. 1-5 (Aug. 2015).
Final Office Action for U.S. Appl. No. 13/047,287 (dated Jun. 4, 2015).
"Digitial cellular telecommunications system (Phase 2+); Universal Mobile Telecommunications System (UMTS); LTE; Location Services (LCS); Evolved Packet Core (EPC) LCS Protocol (ELP) between the Gateway Mobile Location Centre (GMLC) and the Mobile Management Entity (MME); SLg interface (3GPP TS 29.172 version 9.6.0 Release 9),"ETSI TS 129 172, V9.6.0, pp. 1-27 (Apr. 2015).
"Digital cellular telecommunications system (Phase 2+); Universal Mobile Telecommunications System (UMTS); LTE; Location Services (LCS); Diameter-based SLh interface for Control Plane LCS (3GPP TS 29.173 version 12.2.0 Release 12)," ETSI TS 129 173, V12.2.0., p. 1-20 (Oct. 2014).
Non-Final Office Action for U.S. Appl. No. 13/047,287 (dated Sep. 25, 2014).
Supplemental Notice of Allowance and Fee(s) Due for U.S. Appl. No. 12/823,559 (dated Aug. 23, 2013).
Notice of Allowance and Fee(s) Due for U.S. Appl. No. 12/823,559 (dated Aug. 1, 2013).
Email to U.S. Patent and Trademark Office dated Jun. 28, 2013.
Final Office Action for U.S. Appl. No. 12/823,559 (dated Apr. 11, 2013).
Final Office Action for U.S. Appl. No. 13/047,287 (dated Jan. 31, 2013).
Non-Final Office Action for U.S. Appl. No. 12/823,559 (dated Nov. 14, 2012).
"Digital cellular telecommunications system (Phase 2+); Universal Monile Telecommunications System (UMTS); LTE; Location Services (LCS); Service description; Stagel (3GPP TS 22.071 V 11.0.0 Release 11," ETSI TS 122 071 V11.0.0, pp. 1-50 (Oct. 2012).
Restriction and/or Election Requirement for U.S. Appl. No. 12/823,559 (dated Aug. 27, 2012).
Notice of Allowance and Fee(s) due for U.S. Appl. No. 12/581,739 (dated Aug. 8, 2012).
Non-Final Office Action for U.S. Appl. No. 13/047,287 (dated Jun. 6, 2012).
Notice of Allowance and Fee(s) Due and Examiner-Initiated Interview Summary for U.S. Appl. No. 12/581,739 (dated May 15, 2012).
Non-Final Office Action for U.S. Appl. No. 12/722,460 (dated Apr. 9, 2012).
"3rd Generation Partnership Project; Technical Specification Group Services and System Aspects; Telecommunication management; Charging management; Diameter charging applications (Release 11)," 3GPP TS 32.299, V11.3.0, pp. 1-150 (Mar. 2012).
"Net-Net Diameter Director," http://www.oracle.com/us/industries/communications/net-net-diameter-director-ds-1985034.pdf, pp. 1-9 (Copyright 2012).
Final Office Action for U.S. Appl. No. 12/581,739 (dated Dec. 30, 2011).
"3rd Generation Partnership Project; Technical Specification Group Core Network and Terminals; Policy and Charging Control (PCC) over Gx/Sd reference point (Release 11)," 3GPP TS 29.212, V11.3.0, pp. 1-171 (Dec. 2011).
Non-Final Office Action for U.S. Appl. No. 12/581,739 (dated Aug. 26, 2011).
Press Release, "SmartSynch SmartMeters Communicate Using the Largest and Most Available Wireless Networks in the World," http://www.smartsynch.com/SmartSynch_gprs.htm, pp. 1-2 (Downloaded from the Internet on Jul. 5, 2011).
"Solution: Itron Centron GPRS," Data Sheet, http://www.smartsynch.com/SmartSynch_itron_centron.htm, pp. 1-3 (Downloaded from the Internet on Jul. 5, 2011).
Myers, "SmartSynch Introduces Innovative 'DCX' Smart Grid Solution at DistribuTECH," SmartSynch News, http://www.appmesh.com/news/020309.htm, pp. 1-3 Feb. 3, 2009 (Downloaded from the Internet on Jul. 5, 2011).

(56) References Cited

OTHER PUBLICATIONS

"NES System Architecture," Data Sheet, Copyright 2009, pp. 1-2 (Downloaded from the Internet on Jul. 5, 2011).

"Wireless M-Bus and ZigBee®-enabled GSM/GPRS/ EDG Gateway for Smart Metering Introduced," Metering.com, http://www.metering.com/node/13550 Sep. 19, 2008, pp. 1-2 (Downloaded from the Internet on Jul. 5, 2011).

Notification of Transmittal of the Internatioanl Search Report and the Written Opinion of the International Searching Authority, or the Declaration for International Application No. PCT/US2010/027043 (dated Oct. 19, 2010).

"Draft LS on network verification of UE provided location," 3GPP TSG SA WG2 Meeting #81, pp. 1 (Oct. 11-15, 2010).

Notification of Transmittal of the International Search Report and the Written Opinion of the International Searching Authority, or the Declaration for International Application No. PCT/US2009/061187 (dated May 17, 2010).

Press Release, "Echelon and T-Mobile Announce Alliance to Reduce the Cost of a Secure Smart Grid Network for Utilities," Echelon Corp., http://www.3gamericas.org/index.cfm?fuseaction=pressreleasedisplay&pressreleaseid=2201, pp. 1-3 (Apr. 23, 2009).

"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 8)," 3GPP TS 29.272, V8.1.1, pp. 1-57 (Jan. 2009).

"3rd Generation Partnership Project; Technical Specification Group Core Network; Unstructured Supplementary Service Data (USSD); Stage 2 (Release 8)," 3GPP TS 23.090, V8.0.0, pp. 1-32 (Dec. 2008).

"3rd Generation Partnership Project; Technical Specification Group Services and System Aspects; Unstructured Supplementary Service Data (USSD)—Stage 1 (Release 8)," 3GPP TS 22.090, V8.0.0, pp. 1-10 (Dec. 2008).

"Digital cellular telecommunications system (Phase 2+); Universal Mobile Telecommunications System (UMTS); Circuit Switched (CS) fallback in Evolved Packet System (EPS); Stage 2 (3GPP TS 23.272 V 8.0.0 Release 8)," ETSI TS 123 272 V8.0.0, pp. 1-42 (Nov. 2008).

3rd Generation Partnership Project "Technical Specification Group Core Network and Terminals; Study into routeing of MT-SMs via the HPLMN (Release 7)," 3GPP TR 23.840 V7.1.0 (Mar. 2007).

Hakala et al., "Diameter Credit-Control Application," RFC 4006, pp. 1-115 (Aug. 2005).

Communication of European publication No. and information on the application of Article 67(3) EPC for European Patent Application Serial No. 19730571.7 (Apr. 8, 2021).

International Search Report for International Patent Application Serial No. PCT/US2020/065763 (dated Apr. 6, 2021).

First Examination Report for Indian Patent Application Serial No. 201947047367 (dated Mar. 31, 2021).

Notice of Allowance for Chinese Patent Application Serial No. 201880040477.9 (dated Mar. 29, 2021).

Communication under Rule 71 (3) EPC Intention to Grant for European Patent Application Serial No. 18 731 923.1 (Mar. 22, 2021).

First Examination Report for Indian Patent Application Serial No. 201947047012 (dated Mar. 18, 2021).

Commonly-Assigned, co-pending U.S. Appl. No. 17/185,934 for "Methods, Systems, and Computer Readable Media for Mitigating Location Tracking and Denial of Service (DoS) Attacks that Utilize Access And Mobility Management Function (AMF) Location Service," (Unpublished, filed Feb. 25, 2021).

Communication under Rule 71(3) EPC Intention to grant for European Application Serial No. 18 756 018.0 (dated Feb. 24, 2021).

Commonly-Assigned, co-pending U.S. Appl. No. 17/175,260 for "Methods, Systems, and Computer Readable Media for Short Message Delivery Status Report Validation," (Unpublished, filed Feb. 12, 2021).

"3rd Generation Partnership Project; Technical Specification Group Services and System Aspects; Service requirements for the 5G system; Stage 1 (Release 18)," 3GPP TS 22.261, V18.1.1, pp. 1-85 (Jan. 2021).

"3rd Generation Partnership Project; Technical Specification Group Services and System Aspects; Procedures for the 5G System (5GS); Stage 2 (Release 16)," 3GPP TS 23.502, V16.7.1, pp. 1-603 (Jan. 2021).

Fajardo, V. et al., "Diameter Base Protocol, Internet Engineering Task Force (IETF)," RFC 6733, pp. 1-152 (Oct. 2012).

"3rd Generation Partnership Project; Technical Specification Group Core Network and Terminals; Numbering, addressing and identification; (Release 17)," 3GPP TS 23.003, V17.0.0, pp. 1-142 (Dec. 2020).

"3rd Generation Partnership Project; Technical Specification Group Services and System Aspects; Wireless and wireline convergence access support for the 5G System (5GS) (Release 16)," 3GPP TS 23.316, V16.6.0, pp. 1-83 (Dec. 2020).

"3rd Generation Partnership Project; Technical Specification Group Services and System Aspects; Security architecture and procedures for 5G system (Release 17)," 3GPP TS 33.501, V17.0.0, pp. 1-253 (Dec. 2020).

"3rd Generation Partnership Project; Technical Specification Group Core Network and Terminals; 5G System; Common Data Types for Service Based Interfaces; Stage 3 (Release 17)," 3GPP TS 29.571, V17.0.0, pp. 1-128 (Dec. 2020).

"3rd Generation Partnership Project; Technical Specification Group Core Network and Terminals; 5G System; Public Land Mobile Network (PLMN) Interconnection; Stage 3 (Release 16)," 3GPP TS 29.573, V16.5.0, pp. 1-98 (Dec. 2020).

"3rd Generation Partnership Project; Technical Specification Group Core Network and Terminals; 5G System; Location Management Services; Stage 3 (Release 16)," 3GPP TS 29.572, V16.5.0, pp. 1-77 (Dec. 2020).

"3rd Generation Partnership Project; Technical Specification Group Core Network and Terminals; 5G System; Access and Mobility Management Services; Stage 3 (Release 17)," 3GPP TS 29.518, V17.0.0, pp. 1-298 (Dec. 2020).

"3rd Generation Partnership Project; Technical Specification Group Services and System Aspects; System architecture for the 5G System (5GS); Stage 2 (Release 16)," 3GPP TS 23.501, V16.7.0, pp. 1-450 (Dec. 2020).

Commonly-Assigned, co-pending U.S. Appl. No. 17/129,441 for "Methods, Systems, and Computer Readable Media for Mitigating Spoofing Attacks on Security Edge Protection Proxy (SEPP) Inter-Public Land Mobile Network (INTER-PLMN) Forwarding Interface," (Unpublished, filed Dec. 21, 2020).

Commonly-Assigned, co-pending U.S. Appl. No. 17/129,487 for "Methods, Systems, and Computer Readable Media for Ingress Message Rate Limiting," (Unpublished, filed Dec. 21, 2020).

Commonly-Assigned, co-pending U.S. Appl. No. 17/125,943 for "Methods, Systems, and Computer Readable Media for Mitigating 5G Roaming Attacks for Internet of Things (IoT) Devices Based on Expected User Equipment (UE) Behavior Patterns," (Unpublished, filed Dec. 17, 2020).

Commonly-Assigned, co-pending U.S. Appl. No. 17/123,038 for "Methods, Systems, and Computer Readable Media for Message Validation in Fifth Generation (5G) Communications Networks," (Unpublished, filed Dec. 15, 2020).

"3rd Generation Partnership Project; Technical Specification Group Core Network and Terminals; 5G System; Network Function Repository Services; Stage 3 (Release 17)," 3GPP TS 29.510, V17.0.0, pp. 1-229 (Dec. 2020).

Commonly-Assigned, co-pending U.S. Appl. No. 17/099,683 for "Methods, Systems, and Computer Readable Media for Validating Location Update Messages," (Unpublished, filed Nov. 16, 2020).

SMS Test Numbers: SMS Fake Delivery Receipts, Fake DLR—Tel!—SMS Test Platform and SMS services, Nov. 6, 2020, pp. 1-6, https://telqtele.com/sms-fake-delivery-receipts-fake-dlr/.

"3rd Generation Partnership Project; Technical Specification Group Services and System Aspects; Security architecture and procedures for 5G system (Release 16)," 3GPP TS 33.501, V16.4.0, pp. 1-249 (Sep. 2020).

(56) References Cited

OTHER PUBLICATIONS

"3rd Generation Partnership Project; Technical Specification Group Core Network and Terminals; 5G System; Public Land Mobile Network (PLMN) Interconnection; Stage 3 (Release 16)," 3GPP TS 29.573, V16.4.0, pp. 1-95 (Sep. 2020).
"3rd Generation Partnership Project; Technical Specification Group Core Network and Terminals; 5G System; Authentication Server Services; Stage 3 (Release 16)," 3GPP TS 29.509, V16.5.0 pp. 1-60 (Sep. 2020).
"3rd Generation Partnership Project; Technical Specification Group Core Network and Terminals; 5G System; Network Function Repository Services; Stage 3 (Release 16)," 3GPP TS 29.510, V16.5.0, pp. 1-208 (Sep. 2020).
"3rd Generation Partnership Project; Technical Specification Group Core Network and Terminals; Numbering, addressing and identification; (Release 16)," 3GPP TS 23.003, V16.4.0, pp. 1-141 (Sep. 2020).
Communication of European publication number and information on the application of Article 67(3) EPC for European Application Serial No. 18756018.0 (May 13, 2020).
3rd Generation Partnership Project; Technical Specification Group Core Network and Terminals; T8 reference point for Northbound APIs, (Release 15), 3GPP TS 29.122, V15.6.0, pp. 1-300 (Dec. 2019).
DeKok, "The Network Access Identifier," Internet Engineering Task Force (IETF), RFC 7542, pp. 1-30 (May 2015).
Croft, N., "On Forensics: A Silent SMS Attack," Information and Computer Security Architectures (ICSA) Research Group, Department of Computer Science, pp. 1-4, University of Pretoria, South Africa (2012).
Constantin, L., "Remote SMS attack can force mobile phones to send premium-rate text messages: Applications installed by operators on SIM cards can be exploited remotely for SMS fraud and DoS purposes," IDG News Service, Dec. 19, 2011, pp. 1-5, IDG Communications, Inc., United States.
Decision to grant a European patent pursuant to Article 97(1) EPC for European Patent Application Serial No. 18731923.1 (dated Jul. 15, 2021).
Notification of Transmittal of the International Search Report and the Written Opinion of the International Searching Authority, or the Declaration for International Application No. PCT/US2021/024002 (dated Jun. 29, 2021).
Notification of Transmittal of the International Search Report and the Written Opinion of the International Searching Authority, or the Declaration for International Application No. PCT/US2021/024980 (dated Jun. 23, 2021).
Communication of European publication number and information on the application of Article 67(3) EPC for European Patent Application Serial No. 19710842.6 (Apr. 21, 2021).
"3rd Generation Partnership Project; Technical Specification Group Services and System Aspects; Security Aspects; Study on security aspects of the 5G Service based Architecture (SBA) (Release 16)," 3GPP TR 33.855, V16.0.0, pp. 1-104 (Jul. 2020).
"3rd Generation Partnership Project; Technical Specification Group Services and System Aspects; Security Assurance Specification (SCAS) threats and critical assets in 3GPP network product classes (Release 16)," 3GPP TR 33.926, V16.3.0, pp. 1-60 (Mar. 2020).
"3rd Generation Partnership Project; Technical Specification Group Services and System Aspects; System architecture for the 5G System (5GS); Stage 2 (Release 16)," 3GPP TS 23.501 V16.5.1, pp. 1-440 (Aug. 2020).
"3rd Generation Partnership Project; Technical Specification Group Core Network and Terminals; 5G System; Network Function Repository Services; Stage 3 (Release 16)," 3GPP TS 29.510 V16.4.0, pp. 1-192 (Jul. 2020).
"3rd Generation Partnership Project; Technical Specification Group Services and System Aspects; Architecture enhancements for 5G System (5GS) to support network data analytics services (Release 16)," 3GPP TS 23.288 V16.4.0, pp. 1-66 (Jul. 2020).
"3rd Generation Partnership Project; Technical Specification Group Core Network and Terminals; 5G System; Network Data Analytics Services; Stage 3 (Release 16)," 3GPP TS 29.520 V16.4.0, pp. 1-91 (Jun. 2020).
"3rd Generation Partnership Project; Technical Specification Group Core Network and Terminals; 5G System; Technical Realization of Service Based Architecture; Stage 3 (Release 16)," 3GPP TS 29.500 V16.4.0, pp. 1-79 (Jun. 2020).
"3rd Generation Partnership Project; Technical Specification Group Services and System Aspects; Procedures for the 5G System (5GS); Stage 2 (Release 16)," 3GPP TS 23.502 V16.4.0, pp. 1-582 (Mar. 2020).
Sahu et al., "How 5G Registration Works," http://5gblogs.com/5g-registration/, 10 pages (Oct. 12, 2018).
Non-Final Office Action for U.S. Appl. No. 17/175,260 (dated Aug. 29, 2022).
Notice of Allowance and Fee(s) Due and Examiner-Initiated Interview Summary for U.S. Appl. No. 16/929,048 (dated Aug. 24, 2022).
Notification of Transmittal of the International Search Report and the Written Opinion of the International Searching Authority or the Declaration for International Application No. PCT/US2022/026415 (dated Aug. 12, 2022).
Notice to Grant for Japanese Patent Application Serial No. 2021-545918 (dated Jun. 28, 2022).
"5G; Policy and Charging Control signaling flows and parameter mapping (3GPP TS 29.513 version 15.6.0 Release 15)," ETSI TS 129 513, V15.6.0, pp. 1-92 (Jan. 2020).
Final Office Action for U.S. Appl. No. 17/076,482 (dated Aug. 5, 2022).
Notice of Allowance and Fee(s) Due and Examiner-Initiated Interview Summary for U.S. Appl. No. 17/129,487 (dated Jul. 25, 2022).
Notice of Allowance and Fee(s) Due and Examiner-Initiated Interview Summary for U.S. Appl. No. 17/185,934 (dated Jul. 21, 2022).
Commonly-Assigned, co-pending U.S. Appl. No. 17/095,420 for "Methods, Systems, and Computer Readable Media for Mitigating 5G Roaming Spoofing Attacks," (Unpublished, filed Nov. 11, 2020).
Notice of Allowance and Fee(s) Due and Examiner-Initiated Interview Summary for U.S. Appl. No. 16/379,488 (dated Oct. 23, 2020).
Commonly-Assigned, co-pending U.S. Appl. No. 17/076,482 for "Methods, Systems, and Computer Readable Media for Validating a Session Management Function (SMF) Registration Request," (Unpublished, filed Oct. 21, 2020).
Notice of Allowance and Fee(s) Due and Examiner-Initiated Interview Summary for U.S. Appl. No. 16/024,422 (dated Oct. 21, 2020).
"3rd Generation Partnership Project; Technical Specification Group Core Network and Terminals; 5G System; Session Management Services; Stage 3 (Release 16)," 3GPP TS 29.502, V16.5.0, pp. 1-260 (Sep. 2020).
"3rd Generation Partnership Project; Technical Specification Group Services and System Aspects; System architecture for the 5G System (5GS); Stage 2 (Release 16)," 3GPP TS 23.501, V16.6.0, pp. 1-447 (Sep. 2020).
3rd Generation Partnership Project; Technical Specification Group Services and System Aspects; Procedures for the 5G System (5GS); Stage 2 (Release 16), 3GPP TS 23.502, V16.6.0, pp. 1-597 (Sep. 2020).
"3rd Generation Partnership Project; Technical Specification Group Core Network and Terminals; 5G System; Network Function Repository Services; Stage 3 (Release 16)," 3GPP TS 29.510, V16.4.0, pp. 1-206 (Jul. 2020).
"3rd Generation Partnership Project; Technical Specification Group Core Network and Terminals; 5G System; Public Land Mobile Network (PLMN) Interconnection; Stage 3 (Release 16)," 3GPP TS 29.573, V16.3.0, pp. 1-86 (Jul. 2020).
"3rd Generation Partnership Project; Technical Specification Group Services and System Aspects; Security architecture and procedures for 5G system (Release 16)," 3GPP TS 33.501, V16.3.0, pp. 1-248 (Jul. 2020).
Dierks et al., "The Transport Layer Security (TLS) Protocol Version 1.2," RFC 5246, pp. 1-208 (Aug. 2008).

(56) References Cited

OTHER PUBLICATIONS

Housley et al., "Internet X.509 Public Key Infrastructure Certificate and Certificate Revocation List (CRL) Profile," RFC 3280, pp. 1-258 (Apr. 2002).
Decision to grant a European patent pursuant to Article 97(1) EPC for European Patent Application Serial No. 18756018.0 (dated Jul. 29, 2021).
Notification of Transmittal of the International Search Report and the Written Opinion of the International Searching Authority, or the Declaration for International Application No. PCT/US2021/029977 (dated Jul. 9, 2021).
Notification of Transmittal of the International Search Report and the Written Opinion of the International Searching Authority, or the Declaration for International Application No. PCT/US2021/029973 (dated Jul. 7, 2021).
"New Annex for the SEPP in TR 33.926," 3GPP TSG-SA WG3 Meeting #95-BIS, pp. 1-6 (Jun. 24-28, 2019).
"N32 message anti-spoofing within the SEPP," 3GPP TSG SA WG3 (Security), Meeting #91, pp. 1-2 (Apr. 16-20, 2018).
Notification of Transmittal of the International Search Report and the Written Opinion of the International Searching Authority, or the Declaration for International Application No. PCT/US2022/013373 (dated Apr. 11, 2022).
Non-Final Office Action and Examiner Interview Summary for U.S. Appl. No. 16/929,048 (dated Apr. 14, 2022).
Notice of Allowance for U.S. Appl. No. 16/732,098 (dated Apr. 6, 2022).
Examination Report for Indian Application Serial No. 202147030053 (dated Mar. 22, 2022).
Notification of Transmittal of the International Search Report and the Written Opinion of the International Searching Authority or the Declaration for International Application No. PCT/US2021/057156 (dated Mar. 3, 2022).
Non-Final Office Action for Chinese Application Serial No. 202080007649.X (dated Mar. 2, 2022).
Non-Final Office Action for U.S. Appl. No. 17/076,482 (dated Apr. 1, 2022).
Nokia et al., "Support of the mapping from IP addressing information provided to an AF to the user identity," 3GPP SA WG2 Meeting #142e pp. 1-3 (Nov. 16-20, 2020).
China Telecom, "KI #13, New Sol: Trigger Procedures for Requesting Analytics," 3GPP SA WG2 Meeting #S2-139E pp. 1-4 (Aug. 19-Sep. 2, 2020).
First Office Action for Japanese Application Serial No. 2021545918 (dated Mar. 8, 2022).
Non-Final Office Action for U.S. Appl. No. 17/129,487 (dated Mar. 21, 2022).
Decision to grant a European patent pursuant to Article 97(1) EPC for European Patent Application Serial No. 19710842.6 (dated Feb. 24, 2022).
Notice of Allowance for Chinese Application Serial No. 201880040478.3 (dated Feb. 28, 2022).
Notice of Allowance for Japanese Application Serial No. 2019572174 (dated Feb. 8, 2022).
Final Office Action for U.S. Appl. No. 17/099,683 (dated Feb. 15, 2022).
Notification of Transmittal of the International Search Report and the Written Opinion of the International Searching Authority, or the Declaration for International Application No. PCT/US2021/057157 (dated Jan. 27, 2022).
Notification Concerning Availability of the Publication of the International Application for International Application No. PCT/US2021/024002 (Jan. 20, 2022).
Examination Report for Indian Application Serial No. 202147005810 (dated Jan. 24, 2022).
Examination Report for Indian Application Serial No. 202147001641 (dated Jan. 13, 2022).
Examination Report for Indian Application Serial No. 202047056970 (dated Jan. 13, 2022).

Commonly-Assigned, co-pending U.S. Appl. No. 17/319,023 for "Methods, Systems, and Computer Readable Media for Conducting a Velocity Check for Outbound Subscribers Roaming to Neighboring Countries," (Unpublished, May 12, 2021).
Nokia et al., "3gpp-Sbi-Consumer-Id," 3GPP TSG-CT WG4 Meeting #101e pp. 1-4 (Nov. 3-13, 2020).
Nokia et al., "SBA Network Function certificate profile," 3GPPTT TSG-SA WG3 Meeting #98e pp. 1-5 (Mar. 2-6, 2020).
"3rd Generation Partnership Project; Technical Specification Group Services and System Aspects; Security Aspects; Study on security aspects of the 5G Service Based Architecture (SBA) (Release 16)," 3GPP TR 33.855, V1.3.0 pp. 1-52 (Nov. 2018).
Notification of Transmittal of the International Search Report and the Written Opinion of the International Searching Authority, or the Declaration for International Application No. PCT/US2021/042660 (dated Oct. 26, 2021).
Hearing Notice of Indian Application Serial No. 201947047367 (Oct. 11, 2021).
First Office Action for Japanese Application Serial No. 2019572174 (dated Sep. 14, 2021).
Notification of Transmittal of the International Search Report and the Written Opinion of the International Searching Authority, or the Declaration for International Application No. PCT/US2021/033030 (dated Aug. 20, 2021).
First Office Action for Chinese Application Serial No. 201880040478.3 (dated Aug. 26, 2021).
Notification Concerning Availability of the Publication of the International Application for International Application No. PCT/US2020/065763 (Jul. 8, 2021).
Non-Final Office Action for U.S. Appl. No. 17/099,683 (dated Sep. 20, 2021).
Non-Final Office Action for U.S. Appl. No. 17/099,683 (dated Jul. 15, 2022).
Decision to grant a European patent pursuant to Article 97(1) EPC for European Patent Application Serial No. 19710842.6 (dated Jun. 30, 2022).
Notice of Allowance for Chinese Application Serial No. 202080007649.X (dated Jun. 20, 2022).
Communication under Rule 71 (3) EPC Intention to Grant for European Patent Application Serial No. 19 749 059.2 (dated May 16, 2022).
Notification of Transmittal of the International Search Report and the Written Opinion of the International Searching Authority or the Declaration for International Application No. PCT/US2021/042853 (dated Oct. 18, 2021).
Advisory Action and Applicant-Initiated Interview Summary for U.S. Appl. No. 17/099,683 (dated May 23, 2022).
"5G; Procedures for the 5G System (3GPP TS 23.502 version 15.3.0 Release 15)," ETSI TS 123 502, V15.3.0, pp. 1-330 (Sep. 2018).
"Edge Router (DEA)," Mavenir, pp. 1-7 (2017).
Press Release, Echelon and T-Mobile Announce Alliance to Reduce the Cost of a Secure Smart Grid Network for Utilities, Echelon Corp., https://www.tdworld.com/smart-utility/article/20956244/echelon-and-tmobile-announce-alliance-to-reduce-the-cost-of-a-secure-smart-grid-network-for-utilities, p. 1-10 (May 14, 2009).
Final Office Action for U.S. Appl. No. 17/123,038 (dated Mar. 9, 2023).
Office Communication for U.S. Appl. No. 17/125,943 (dated Mar. 1, 2023).
Notice of Allowance and Fee(s) Due for U.S. Appl. No. 17/175,260 (dated Feb. 27, 2023).
Intent to Grant for Japanese Patent Application No. 2020-572898 (dated Feb. 14, 2023).
Intent to Grant for Japanese Patent Application No. 2021-506739 (dated Jan. 24, 2023).
Notice of Allowance and Fee(s) Due for U.S. Appl. No. 17/319,023 (datd Feb. 10, 2023).
Non-Final Office Action for U.S. Appl. No. 17/125,943 (dated Feb. 9, 2023).
Notification of reasons for refusal for Japanese Patent Application No. 2020-572898 (dated Oct. 25, 2022).
Advisory Action for U.S. Appl. No. 17/076,482 (dated Oct. 25, 2022).

(56) References Cited

OTHER PUBLICATIONS

Final Office Action and Applicant-Initiated Interview Summary for U.S. Appl. No. 17/099,683 (dated Oct. 24, 2022).
Communication of European publication No. and information on the application of Article 67(3) EPC for European Patent Application No. 20842462.2 (Oct. 12, 2022).
Decision to grant a European patent pursuant to Article 97(1) EPC for European Patent Application Serial No. 19749059.2 (dated Sep. 29, 2022).
Decision to Grant for Japanese Patent Application Serial. No. 2020-505462 (dated Aug. 2, 2022).
Non-Final Office Action for U.S. Appl. No. 17/319,023 (dated Sep. 28, 2022).
Non-Final Office Action for U.S. Appl. No. 17/123,038 (dated Sep. 30, 2022).
Communication of European publication No. and information on the application of Article 67(3) EPC for European Patent Application Serial No. 20720580.8 (Jan. 19, 2022).
Supplemental Notice of Allowability for U.S. Appl. No. 17/076,482 (dated Jan. 19, 2023).
Non-Final Office Action for U.S. Appl. No. 17/129,441 (dated Jan. 19, 2023).
Intent to Grant for European Patent Application No. 18705270.9 (dated Dec. 8, 2022).
Applicant Initiated Interview Summary for U.S. Appl. No. 17/319,023 (dated Jan. 10, 2023).
Non-Final Office Action for U.S. Appl. No. 17/099,683 (dated Jan. 4, 2023).
Telekom, "N32 Message Anti-Spoofing within the SEPP", 3GPP TSG SA WG3 (Security) Meeting #91, S3-181480, pp. 1-2 (Apr. 2018).
Huawei, "New Annex for the SEPP in TR 33.926", 3GPP TSG-SA WG3 Meeting #95-BIS, S3-192180, pp. 1-5 (Jun. 2019).
"5G; 5G System; Public Land Mobile Network (PLMN) Interconnection; Stage 3 (3GPP TS 29.573 Version 16.3.0 Release 16)," ETSI TS 129 573, V16.3.0, pp. 1-93 (Jul. 2020).
Communication under Rule 71 (3) EPC Intention to Grant for European Patent Application Serial No. 20 720 580.8 (dated Dec. 23, 2022).
Non-Final Office Action for U.S. Appl. No. 17/095,420 (dated Jan. 3, 2023).
Applicant-Initiated Interview Summary for U.S. Appl. No. 17/099,683 (dated Dec. 12, 2022).
Notice of Allowance and Fee(s) Due for U.S. Appl. No. 17/076,482 (dated Dec. 1, 2022).
Notice to Grant for Japanese Patent Application Serial No. 2021-500828 (dated Nov. 25, 2022).
Examination Report for Indian Application Serial No. 202247032585 (dated Nov. 15, 2022).
Non-Final Office Action for Chinese Patent Application Serial No. 202080091056.6 (dated Oct. 27, 2022).
Supplemental Notice of Allowability for U.S. Appl. No. 17/175,260 (dated March 8, 2023).

\* cited by examiner

METHODS, SYSTEMS, AND COMPUTER READABLE MEDIA FOR 5G USER EQUIPMENT (UE) HISTORICAL MOBILITY TRACKING AND SECURITY SCREENING USING MOBILITY PATTERNS

TECHNICAL FIELD

The subject matter described herein relates to enhancing security in 5G mobile communication networks. More particularly, the subject matter described herein relates to methods, systems, and computer readable media for 5G UE historical mobility tracking and security screening using mobility patterns.

BACKGROUND

In 5G telecommunications networks, the network node that provides service is referred to as a producer network function (NF). A network node that consumes services is referred to as a consumer NF. A network function can be both a producer NF and a consumer NF depending on whether it is consuming or providing service.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. Consumer NFs can subscribe to receive information about producer NF instances that have registered with the NRF.

In addition to consumer NFs, another type of network node that can subscribe to receive information about NF service instances is a service communication proxy (SCP). The SCP subscribes with the NRF and obtains reachability and service profile information regarding producer NF service instances. Consumer NFs connect to the SCP, and the SCP load balances traffic among producer NF service instances that provide the required service or directly routes the traffic to the destination producer NF instance.

In addition to the SCP, other examples of intermediate proxy nodes or groups of network nodes that route traffic between producer and consumer NFs include the security edge protection proxy (SEPP), the service gateway, and nodes in the 5G service mesh. The SEPP is the network node used to protect control plane traffic that is exchanged between different 5G public land mobile networks (PLMNs). As such, the SEPP performs message filtering, policing and topology hiding for all application programming interface (API) messages.

The service gateway is a node that sits in front of a group of producer NFs that provide a given service. The service gateway may load balance incoming service requests among the producer NF instances that provide the service in a manner similar to the SCP.

The service mesh is a name for a group of intermediate proxy nodes that enable communications between producer and consumer NFs. The service mesh may include one or more SCPs, SEPPs, and service gateways.

One vulnerability that exists with the current 5G network architecture is that criminals may be able to use network spoofing to send signaling commands to other networks declaring that a mobile device is roaming in their network and should be forwarded to the new serving network. This permits interception of text messages and voice calls. Network operators currently rely on firewall appliances to detect these anomalies but it is nearly impossible to determine if a mobile device is actually located in the network declaring so by a location update or corresponding 5G UE location registration message.

In firewall appliances used today, velocity checks are used to determine if it is possible for a mobile device to be able to register in one location and shortly thereafter register in another location. This requires extensive administrative efforts to enter the distance from the home network to every major city in the world and therefore is not a feasible solution.

In light of these difficulties, there exists a need for methods, systems, and computer readable media for 5G UE historical mobility tracking and security screening.

SUMMARY

A method for historical 5G user equipment (UE) mobility tracking and security screening includes receiving, at a network data aggregation node including at least one processor, UE registration data from 5G network functions (NFs) as UEs connect to different network locations. The method further includes aggregating, at the network node, registration data for individual UEs from the 5G NFs to produce mobility patterns for the UEs. The method further includes receiving, at the network node and from a 5G NF located in a home network of the UE, a request for a mobility pattern of a UE in response to receiving a message for effecting a new registration for the UE. The method further includes responding to the request by transmitting the mobility pattern to the 5G NF located in the home network of the UE.

According to another aspect of the subject matter described herein, receiving the UE registration data includes receiving a mobility pattern for the UE from at least one of the 5G NFs.

According to another aspect of the subject matter described herein, the network data aggregation node comprises a network data analytics platform (NWDAF) or unified data repository (UDR).

According to another aspect of the subject matter described herein, the network data aggregation node comprises a non-3GPP defined network data aggregation platform.

According to another aspect of the subject matter described herein, aggregating the registration data to generate the mobility patterns comprises, for each mobility pattern, storing an indicator of location of a UE, a timestamp of when the UE registered at the location, and a type allocation code (TAC) for each instance of registration of the UE.

According to another aspect of the subject matter described herein, the 5G NF located in the home network of the UE comprises a security edge protection proxy (SEPP) and further comprising, at the SEPP, receiving the mobility pattern and determining, based on the mobility pattern, whether the message for effecting the new registration indicates a UE registration pattern anomaly.

According to another aspect of the subject matter described herein, the method for 5G historical mobility tracking and security screening includes, at the SEPP, in response to determining that the message for effecting the new registration indicates a UE registration pattern anomaly, blocking the message for effecting the new registration.

According to another aspect of the subject matter described herein, the method of 5G historical mobility tracking an security screening includes, at the SEPP, in response to determining that the message for effecting the new registration indicates a UE registration anomaly, initiating paging of the UE at a location specified in the UE registration, and, in response to successful paging of the UE at the location specified in the UE registration, forwarding the message for effecting the new registration to a unified data management (UDM) function in the home network of the UE.

According to another aspect of the subject matter described herein, the UE comprises an Internet of things (IoT) device.

According to another aspect of the subject matter described herein, the mobility pattern includes a type allocation code (TAC) for the UE and the method further comprises, at the SEPP, determining a device type from TAC, comparing the mobility pattern to mobility patterns of devices of the same or similar type as the UE, and determining whether the registration is anomalous based on results of the comparison.

According to another aspect of the subject matter described herein, a system for historical 5G user equipment (UE) mobility tracking and security screening is provided. The system includes a network data aggregation node including at least one processor. The system further includes a 5G UE mobility pattern generator for receiving registration data from 5G network functions (NFs) as UEs connect to different network locations, aggregating registration data for the UEs to produce mobility patterns for the UEs, receiving, from a 5G NF located in a home network of a UE, a request for the mobility pattern of the UE generated in response to a message for effecting a new registration for the UE, and responding to the request transmitting the mobility pattern to the 5G NF in the home network of the UE.

According to another aspect of the subject matter described herein, receiving the UE registration data includes receiving a mobility pattern for the UE from at least one of the 5G NFs.

According to another aspect of the subject matter described herein, in aggregating the registration data from the 5G NFs to generate the mobility patterns, the 5G UE mobility pattern generator is configured to store an indicator of location of the UE, a timestamp of when the UE registered at the location, and a type allocation code (TAC) for each instance of registration of the UE.

According to another aspect of the subject matter described herein, the system for 5G historical mobility tracking and security screening includes a security edge protection proxy (SEPP) for receiving the mobility pattern and determining, based on the mobility pattern, whether the message for effecting the new registration indicates a UE registration pattern anomaly.

According to another aspect of the subject matter described herein, the SEPP is configured to, in response to determining that the new registration indicates a UE registration pattern anomaly, block the new UE registration.

According to another aspect of the subject matter described herein, the SEPP is configured to, in response to determining that the message for effecting the new registration indicates a UE registration anomaly, initiate paging of the UE at a location specified in the UE registration, and, in response to successful paging of the UE at the location specified in the UE registration, forward the message for effecting the new registration to a user data management (UDM) function in the home network of the UE.

According to another aspect of the subject matter described herein, the mobility pattern includes a type allocation code (TAC) for the UE and wherein the SEPP is configured to determine a device type from TAC, compare the mobility pattern to mobility patterns of devices of the same or similar type as the UE, and determine whether the registration is anomalous based on results of the comparison.

According to another aspect of the subject matter described herein, a non-transitory computer readable medium having stored thereon executable instructions that when executed by a processor of a computer control the computer to perform steps is provided. The steps include receiving, at a network data aggregation node including at least one processor, UE registration data from 5G network functions (NFs) as UEs connect to different network locations. The steps further include aggregating, at the network node, registration data for individual UEs to produce mobility patterns for the UEs. The steps further include receiving, at the network node and from a 5G NF located in a home network of the UE, a request for a mobility pattern of a UE in response to receiving a message for effecting a new registration for the UE. The steps further include responding to the request by transmitting the mobility pattern to the NF located in the home network of the UE.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
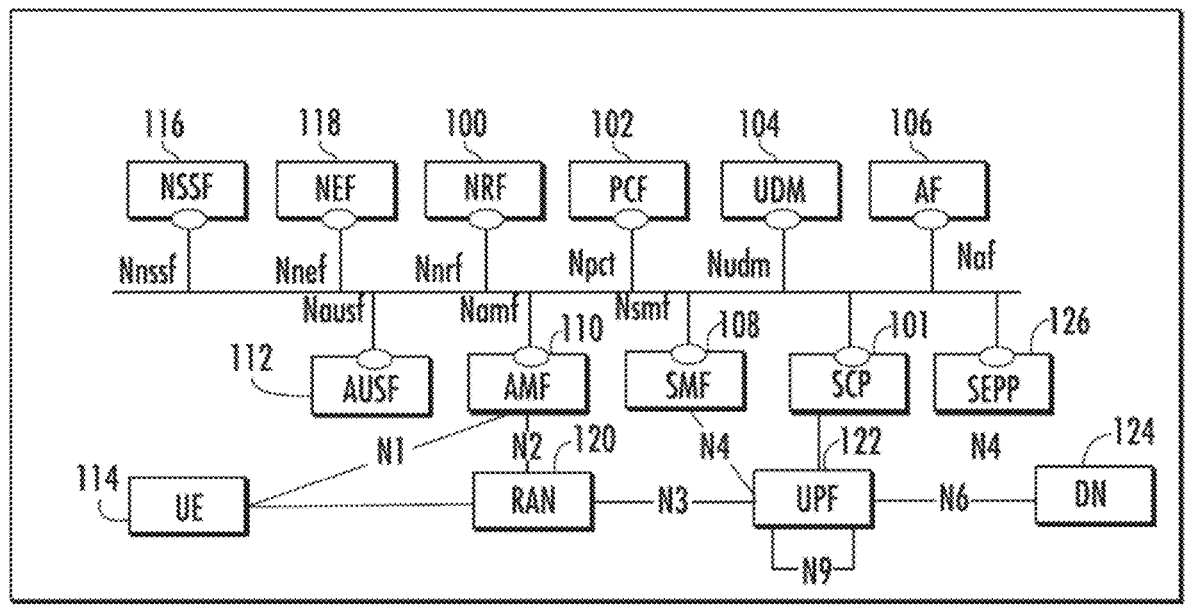
FIG. 1 is a network diagram illustrating an exemplary 5G network architecture.

The subject matter described herein relates to methods, systems, and computer readable media for 5G UE historical mobility tracking and security screening using mobility patterns. FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs. In addition, using the methodologies described herein, SCP 101 may perform preferred NF location based selection and routing.

NRF 100 is a repository for NF or service profiles of producer NF instances. In order to communicate with a producer NF instance, a consumer NF or an SCP must obtain the NF or service profile or the producer NF instance from NRF 100. The NF or service profile is a JavaScript object notation (JSON) data structure defined in Third Generation Partnership Project (3GPP) Technical Specification (TS) 29.510. The NF or service profile definition includes at least one of a fully qualified domain name (FQDN), an Internet protocol (IP) version 4 (IPv4) address or an IP version 6 (IPv6) address. In FIG. 1, any of the nodes (other than NRF 100) can be either consumer NFs or producer NFs, depending on whether they are requesting or providing services. In the illustrated example, the nodes include a policy control function (PCF) 102 that performs policy related operations in a network, a user data management (UDM) function 104 that manages user data, and an application function (AF) 106 that provides application services. The nodes illustrated in FIG. 1 further include a session management function (SMF) 108 that manages sessions between access and mobility management function (AMF) 110 and PCF 102.

AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse two SEPP functions, one for the home PLMN and the other for the foreign PLMN.

Figure 2:
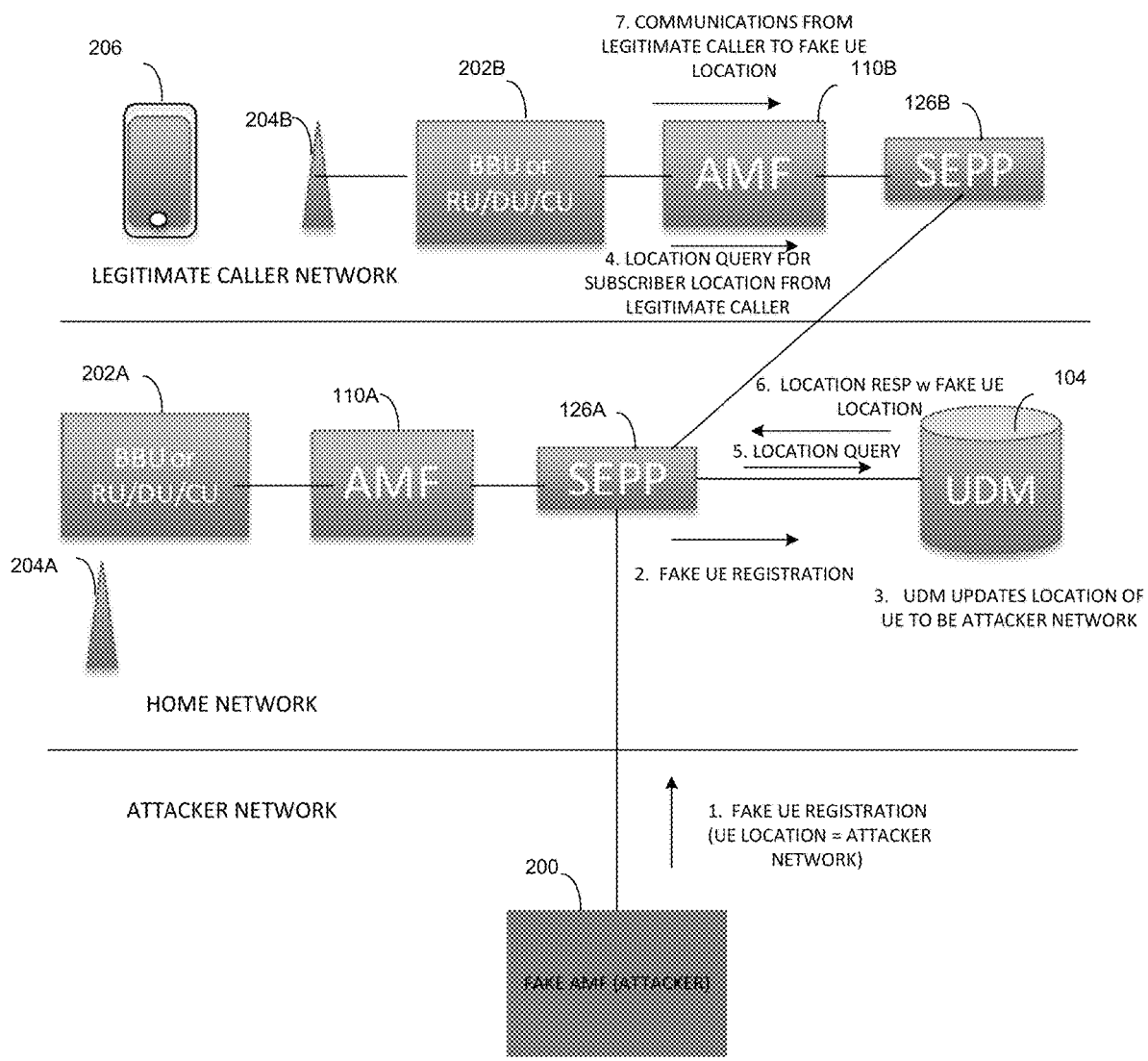
FIG. 2 is a network diagram illustrating an exemplary attack scenario where an attacker sends a fake UE registration to the home network to direct subsequent communications for the UE to the attacker.

As stated above, one problem that occurs in 5G networks is that attackers can spoof the identity of a network serving a mobile subscriber in a UE registration message, cause the home network to store a false location for the UE, and, as a result, subsequent communications intended for the real UE can be directed for an attacker. FIG. 2 illustrates an exemplary attack scenario where an attacker sends a fake UE registration and uses the fake UE registration to intercept communications to a UE. In addition to the 5G NFs described above with respect to FIG. 1, in FIG. 2, the network includes. radio access network nodes 202A, 202B, 204A, and 204B. Radio access network nodes 202A, 202B, 204A, and 204B enable wireless communications with UEs. The architecture of radio access network nodes 202A, 202B, 204A, and 204B depends on how the gNB function in the network is implemented. gNB functionality may be implemented using a base band unit (BBU) where the functionality of the gNB is not split into separate nodes or split into separate distributed unit (DU) and control unit (CU) nodes. The CU is a logical node that includes gNB functions like transfer of user data, mobility, control, radio access network sharing positioning, etc. The DU is the logical node that implements a subset of the gNB functions depending on the functional split. The operation of the DU is controlled by the CU. The radio unit (RU) is just another name for the CU.

Referring to the message flow in FIG. 2, in step 1, an attacker 200 impersonates an AMF by sending a fake UE registration to the home network of a UE. The fake UE registration identifies the UE location as the attacker's network. However, the UE is not present in the attacker's network.

An SEPP 126A located in the UE's home network receives the fake UE registration. In this example, it is assumed that SEPP 126A does not implement security screening based on mobility pattern information. Accordingly, in step 2, SEPP 126A in the home network sends the fake UE registration to UDM 104 in the home network.

UDM 104 likewise does not implement security screening of UE registrations based on mobility patterns. Accordingly, in step 3, UDM 104 updates the location of the UE in the database record maintained by the UDM for the UE to be the attacker network. The location of the UE stored by UDM 104 is used by other nodes to communicate with the UE. However, because the location stored for the UE in FIG. 2 is fake, the registration of the fake location will cause the communications will be redirected to the attacker.

In step 4, a legitimate caller UE 206 initiates communications (e.g., a voice call or text message) with the UE whose registration has been compromised. The initiation of communications causes AMF 110B located in the calling UE's network to send a location query to the home network of the UE (step 4). SEPP 126B located in the caller's network forwards the location query to the called UE's home network. SEPP 126A receives the location query and, in step 5, forwards the location query to UDM 104.

In step 6, UDM 104 performs a lookup in its database using the UE identified in the location query and generates a location response including the registered location of the UE. In this case, the registered location is the attacker's network. UDM 104 sends the response with the fake UE location to the requesting AMF via SEPP 126A and SEPP 126B. SEPP 126B forwards the response with the fake UE location to AMF 110B. In step 7, AMF 110B forwards communications from UE 206 to the location specified in the location response message, which, in this case, is the location of attacker 200. Thus, without some security screening, attacker 200 can redirect voice calls, text messages, or other communications intended for a UE whose registration has been compromised to the attacker's network.

Figure 3:
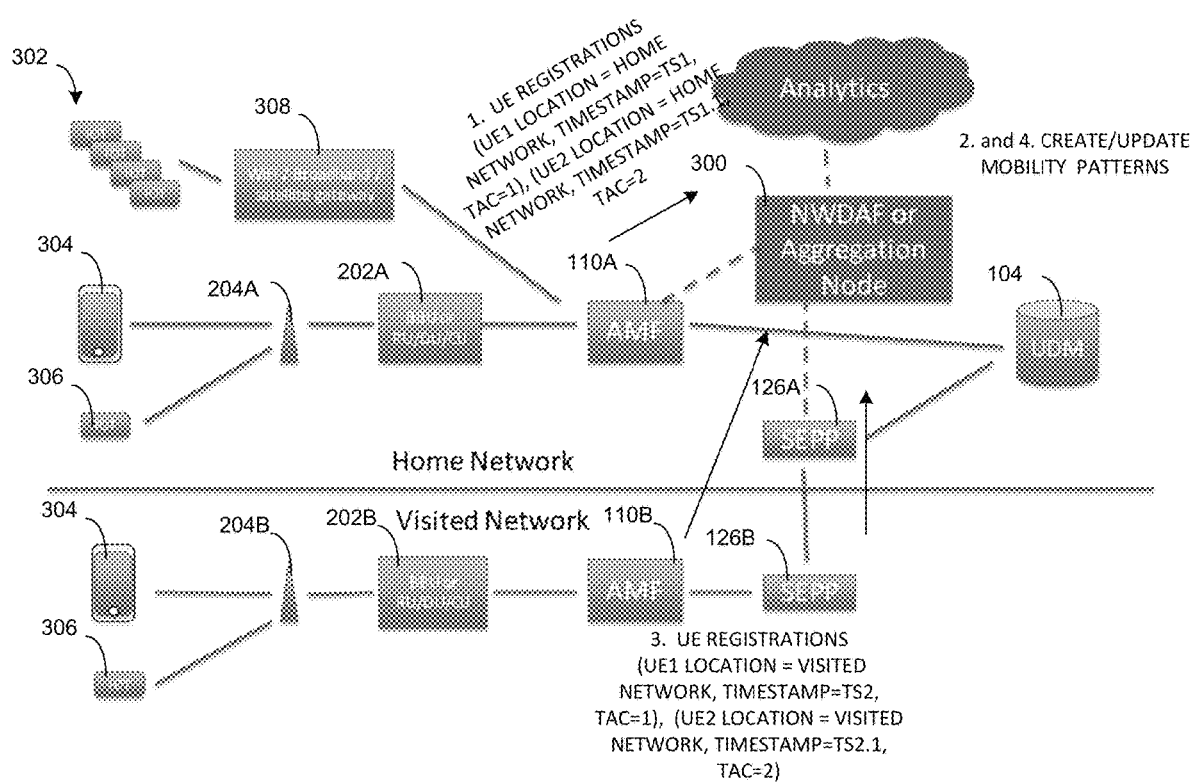
FIG. 3 is a network diagram illustrating a network data analytics function (NWDAF) or aggregation node that generates mobility patterns for UEs and an SEPP that screens UE registrations using mobility patterns.

To reduce the likelihood of successful redirection of communications to an attacker's network, the subject matter described herein includes collecting mobility pattern information for a UE and using the mobility pattern information to perform security screening of registrations sent for a UE. FIG. 3 is a network diagram illustrating the use of an aggregation node to generate mobility pattern information that is usable to screen for fake UE registrations. Referring to FIG. 3 an aggregation node 300 may be a computing platform that collects UE registration information from registrations of UEs 302, 304, and 306 as the UEs register with different networks. In the illustrated example, the UEs include IoT devices and mobile computing devices, including mobile handsets, tablets, laptops, etc. Aggregation node 300 may be implemented using a computing platform capable of collecting UE registration data, aggregating the registration data, producing mobility patterns from the UE registration data, and providing the mobility patterns to querying NFs for UE registration security screening. In one example, aggregation node 300 may be implemented using an NWDAF as defined in 3GPP TS 29.520. The NWDAF allows consumer NFs to subscribe to receive notification of events from the NWDAF and also to request for one time notification of an event. The request-response communications model is more applicable to the architecture in FIG. 3 where the SEPP requests a mobility pattern from aggregation node 300 in response to receiving a new UE registration. It should also be noted that although aggregation node 300 could can be implemented by an NWDAF, the subject matter described herein is not limited to using an NWDAF to generate mobility patterns. In an alternate implementation, an non-3GPP defined network function may be used to receive the UE registration data, generate the mobility patterns, and provide the mobility patterns to requesting network functions.

In the message flow illustrated in FIG. 3, when any of UEs 302, 304, or 306 connects to a network via one of radio access network nodes 202A and 202B or via Wi-Fi/broadband/satellite gateway 308, the serving AMF sends a UE registration to UDM 104 located in the home network of the UE and sends a copy of the registration or registration data extracted from the UE registration to network data aggregation node 300. In FIG. 3, in step 1, UEs 304 and 306 connect to the home network, and home AMF 110A sends a copy of the UE registration information for each registration to network data aggregation node 300. The UE registration information includes an indicator of the UE location, which in this example is the home network of the UE, the timestamp of the registration, and the type allocation code (TAC), which identifies the UE device type. In the illustrated example, the registration information for UE 304 includes the UE location identifier of the home network, a timestamp of TS1, and a TAC of 1. The registration information for UE 306 includes a UE location identifier that identifies the home network, a timestamp of TS1.1, and a TAC of 2, since UE 306 is an IoT device, which is a different type of device than UE 304.

In step 2, network data aggregation node 300 receives or updates mobility pattern information for the registering UEs. For example, network data aggregation node 300 may maintain a mobility pattern database for all UEs that network data aggregation node 300 tracks. When network data aggregation node 300 receives registration data regarding a UE, network data aggregation node 300 performs a lookup in its mobility pattern database to determine if a mobility pattern record exists for the UE. If a record does not exist, network data aggregation node 300 may generate a new mobility pattern record for the UE. If a record exists, network data aggregation node 300 may update the existing mobility pattern record for the UE based on the newly received UE registration data.

In the illustrated example, it is assumed that the registrations are new (first time) registration for UEs 304 and 306. Accordingly, network data aggregation node 300 will create the following mobility pattern records for UEs 304 and 306:

TABLE 1

Mobility Pattern for UE 304 after First Registration

| UE ID | Location | Location Timestamp | TAC |
|---|---|---|---|
| UE1 | Home NW | TS1 | 1 |

TABLE 2

Mobility Pattern for UE 306 after First Registration

| UE ID | Location | Location Timestamp | TAC |
|---|---|---|---|
| UE2 | Home NW | TS1.1 | 2 |

Continuing with the example in FIG. 3, UEs 304 and 306 roam into a visited network and connect to the visited network via radio access network nodes 204B and 202B. In step 3, the serving AMF 110B sends new UE registrations (one for each of UEs 304 and 306) to the home network of UEs 304 and 306 and sends a copy of the UE registration data to network data aggregation node 300. In the illustrated example, the aggregation data includes an identifier of the visited network as the UE location, a timestamp of TS2, and a TAC of 1 and 2, respectively, for UEs 304 and 306.

Network data aggregation node 300 receives the UE registration data, determines that mobility pattern records already exist for the UEs, and i[dates the mobility pattern records for UEs 304 and 306. Tables 3 and 4 below illustrate the updated mobility patterns that may be stored for UEs 304 and 306.

TABLE 3

Updated Mobility Pattern for UE 304 after Second Registration

| UE ID | Location | Location Timestamp | TAC |
| --- | --- | --- | --- |
| UE1 | Home NW | TS1 | 1 |
|  | Visited NW1 | TS2 | 1 |

TABLE 4

Updated Mobility Pattern for UE 306 after Second Registration

| UE ID | Location | Location Timestamp | TAC |
| --- | --- | --- | --- |
| UE2 | Home NW | TS1.1 | 2 |
|  | Visited NW1 | TS2.1 | 2 |

Figure 4:
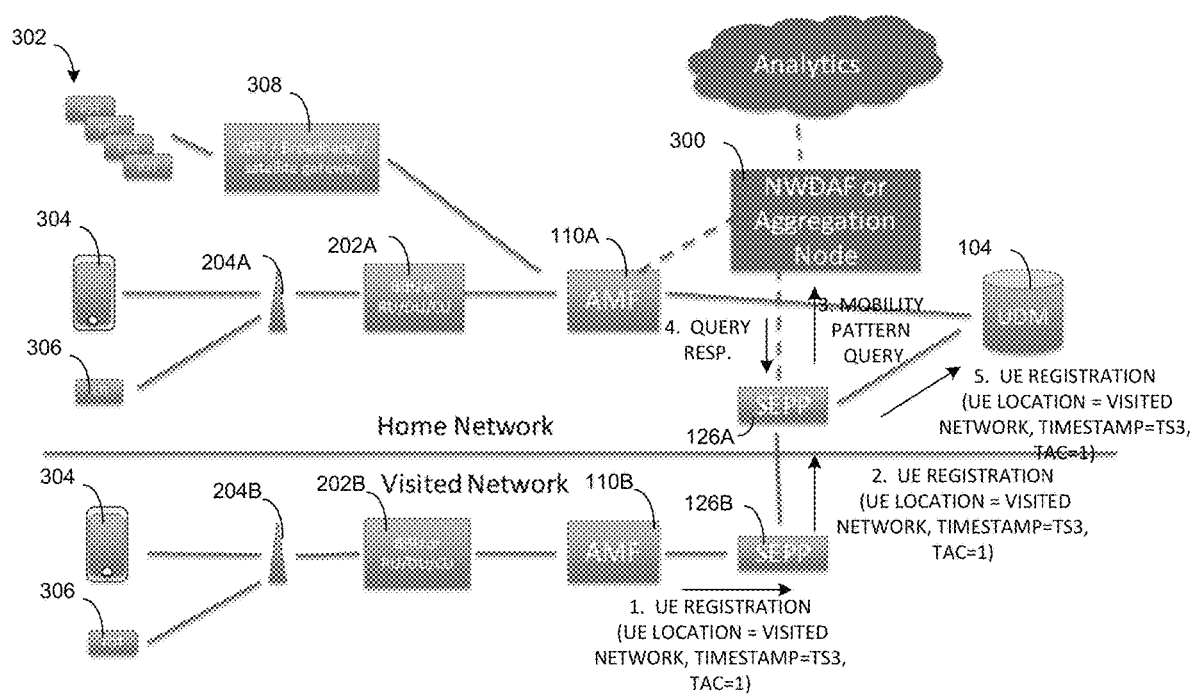
FIG. 4 is a network diagram of the same network illustrated in FIG. 3 where a UE registration is screened based on mobility pattern information and the UE registration is allowed because the SEPP determines from the mobility pattern information that the registration is not anomalous.

The data illustrated in Tables 1-4 may be used by requesting network nodes to determine whether a registration for a UE is anomalous and to perform security screening for UE registrations. FIG. 4 illustrates the use of the mobility pattern to screen a UE registration where the UE registration is determined not to be anomalous and is allowed. Referring to FIG. 4, in step 1, it is assumed that UE 304 roams from the home network into a visited network. When UE 304 connects to the visited network via radio access nodes 204B and 202B, serving AMF 110B sends a UE registration message to UDM 104 located in the home network of UE 304. The UE registration identifies the UE location as visited network #1 and includes the timestamp TS3 and the TAC of 1. In step 2, the UE registration is forwarded to the home network via SEPP 126B in the visited network and SEPP 126A in the UE's home network.

In step 3, SEPP 126A in the home network, in response to receiving the UE registration, sends a mobility pattern query to aggregation node 300. Aggregation node 300 responds to the mobility pattern query with a query response in step 4 that includes the mobility pattern.

SEPP 126A compares the UE location, timestamp, and type allocation code in the registration to the mobility pattern received from aggregation node 300. In this example, it is assumed that the UE is visiting a network that the UE has visited before. Accordingly, SEPP 126A determines that the UE registration is not anomalous and, in step 5, forwards the UE registration to UDM 104 in the UE's home network.

Figure 5:
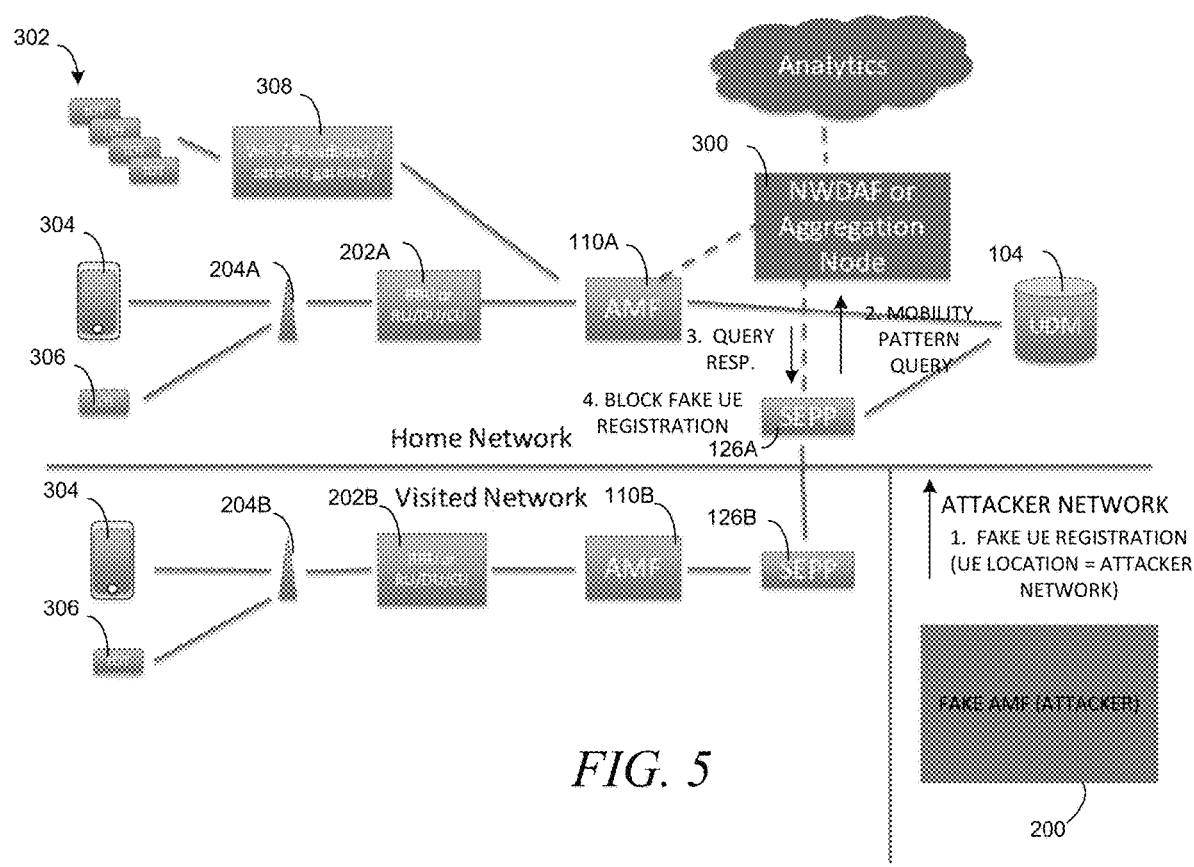
FIG. 5 is a network diagram illustrating the same network as FIG. 3 where a UE registration is screened based on mobility pattern information and the UE registration is blocked because the SEPP determines from the mobility pattern information that the registration is anomalous.

FIG. 5 illustrates the case where a UE registration is blocked based on mobility pattern information. Referring to FIG. 5, in step 1, an attacker, 200 emulates an AMF by sending a fake UE registration to the home network to home network of a UE. In the fake UE registration, the attacker includes an identifier of the of the attacker's network instead of the location where a real UE is registered.

In step 2, SEPP 126A receives the fake UE registration and sends a mobility pattern query to aggregation node 300. The mobility pattern query identifies the UE and the location of the UE contained in the registration message.

Aggregation node 300 receives the mobility pattern query, performs a lookup in its mobility pattern database using the UE identifier obtained from the mobility pattern query, and retrieves a mobility pattern for the UE. In step 3, aggregation node 300 responds to the mobility pattern query with a query response that includes the mobility pattern. The response may optionally include an indication that the UE registration is anomalous based on a determination made by aggregation node 300.

SEPP 126A receives the response and determines that the response is anomalous. In a simple example, SEPP 126A may determine that the response is anomalous if the UE location specified in the registration does not match any of the previous UE registration locations indicated in the mobility pattern. In this example, SEPP 126A determines that the mobility pattern does not correspond to a network where the UE has been registered in the past. Accordingly in step 4, SEPP 126A blocks the fake UE registration. SEPP 126A may also implement further verification before blocking the UE registration. Examples of further verification will be described in more detail below.

Figure 6:
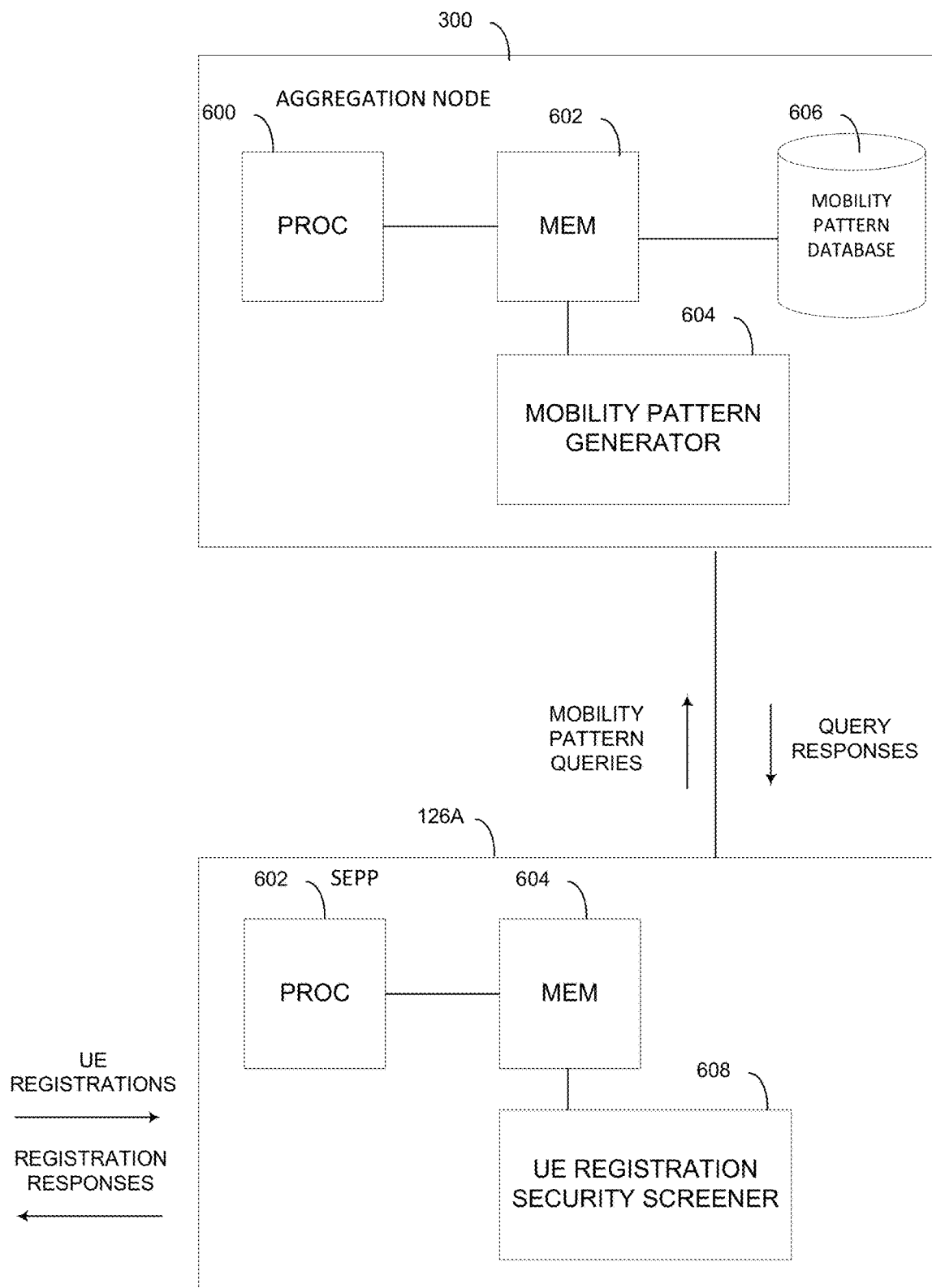
FIG. 6 is a block diagram illustrating an exemplary architecture for an aggregation node and an SEPP for performing 5G historical mobility tracking and security screening based on mobility patterns.

FIG. 6 is a block diagram illustrating an exemplary architecture for aggregation node 300 and SEPP 126A for performing security screening using mobility patterns. Referring to FIG. 6, aggregation node 300 and SEPP 126A each include at least one processor 600 and memory 602. Aggregation node 300 includes a mobility pattern generator 604 that generates mobility patterns based on UE registration data received from AMFs and stores the mobility patterns in a mobility pattern database 606. Alternatively, rather than receiving the UE registration data from AMFs in the networks where UEs roam, mobility pattern generator 604 may receive the UE registration data from SEPPs in the network where UEs roam. In yet another alternative, mobility pattern generator 604 may receive the UE registration data used to populate mobility pattern database 606 from home network SEPPs in response to incoming registration requests for roaming subscribers of each SEPP's home network. Mobility pattern generator 604 may utilize the mobility pattern information in mobility pattern database 606 to respond to mobility pattern queries from home network SEPPs.

SEPP 126A includes a UE registration security screener 608 that receives UE registrations from AMFs, formulates queries to network data aggregation node 300, receives mobility pattern information from aggregation node 300, and determines whether to block UE registrations based on the mobility pattern information. UE registration security screener 608 may block UE registrations that are identified as anomalous based on the mobility pattern information. UE registration security screener 608 may also perform UE location verification after an initial determination that a UE registration is anomalous. In one example, UE registration security screener 608 may initiate paging of the UE at the location specified in the UE registration. If the UE is successfully paged, this indicates the presence of a real UE at the location specified in the UE registration, and UE registration security screener 608 may allow the registration. If the UE is not successful paged, UE registration security screener 608 may block the registration as fake. In another example, UE registration security screener 608 may allow registrations identified as anomalous but send a message to the network operator including registration data (network identifier, UE identifier, TAC, etc.) for the anomalous registrations.

Figure 7:
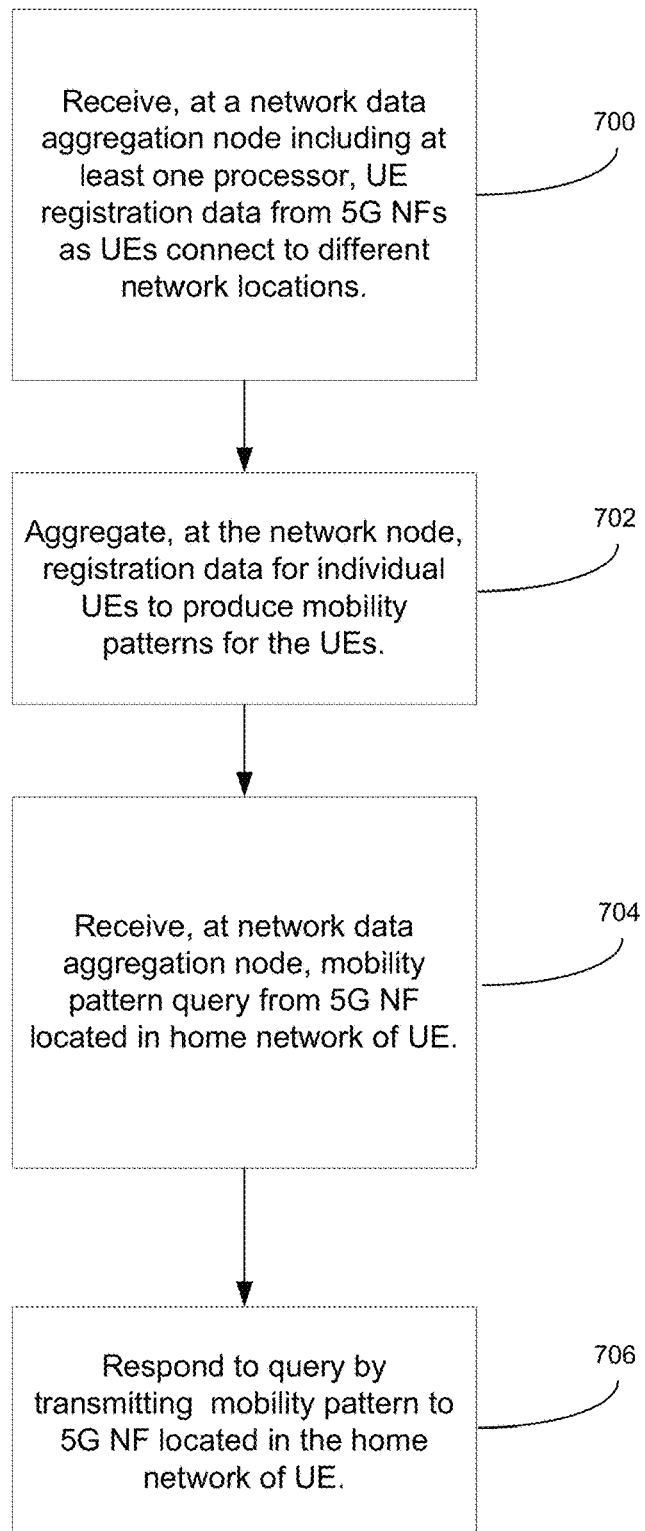
FIG. 7 is a flow chart illustrating an exemplary process performed by an aggregation node in generating mobility patterns and providing the mobility patterns to a requesting node.

FIG. 7 is a flow chart illustrating an exemplary process performed by, aggregation node 300 in generating mobility patterns and providing the mobility patterns to requesting NFs. Referring to FIG. 7, in step 700, aggregation node 300 receives UE registration data from 5G NFs as UEs connect to different network locations. For example, aggregation, node 300 may receive UE registration data, such as registration locations, timestamps, and type allocation codes from AMFs as UEs register with networks served by the AMFs. In addition, or, alternatively, aggregation node 300 may receive mobility patterns as defined in section. 5.3.4.2 of 3GPP TS 23.501. 3GPP TS 23.501 indicates that the mobility pattern is a concept that may be used by the AMF to characterize and optimize UE mobility. The AMF determines and updates the mobility pattern of the UE based on the subscription of the UE, statistics of UE mobility, network local policy, UE assisted information, or any combination of these items. The statistics of UE mobility can be historical or expected UE moving trajectory. If the NWDAF is deployed, the statistics of can also be analytics, i.e., statistics or predictions provided by the NWDAF. According to the subject matter described herein, the mobility pattern information can be used by the SEPP to perform UE registration security screening, which is not mentioned as a use of the mobility pattern in 3GPP TS 23.501.

Returning to FIG. 7, in step 702, the aggregation node aggregates registration data for the UEs received from the 5G NFs to produce mobility patterns for individual UEs. For example, aggregation node 300 may aggregate UE registration data from different AMFs to produce mobility patterns for the UEs, examples of which are illustrated above and Tables 1-4. Aggregation node 300 may store the mobility patterns in mobility pattern database 606.

In step 704, the network data aggregation node receives a mobility pattern query from a 5G NF located in the home network of the UE. For example, SEPP 126A may send a mobility pattern query to aggregation node 300. The mobility pattern query may be generated in response to a request generated by an AMF currently serving the UE to register a UE's current location with the home network UDM or by an attacker impersonating an AMF seeking to update the UE's location to point to the attacker's network. SEPP 126A may cache the UE registration request pending a determination as to whether the registration request is anomalous based on the mobility pattern information. The mobility pattern query may identify the UE for which registration is being requested. The mobility pattern query may optionally include the network location of the UE extracted from the registration request for the case where aggregation node 300 makes a determination as to whether the registration request is anomalous.

In step 706, aggregation node 300 responds to the mobility pattern query by transmitting the mobility pattern to the 5G NF located in the home network of the UE. For example, aggregation node 300 may locate the mobility pattern for the UE in mobility pattern database 606 and transmit the mobility pattern to SEPP 126A located in the home network of the UE. In addition, aggregation node 300 may provide an indication in the response and to whether aggregation node 300 classifies the registration as anomalous.

Figure 8:
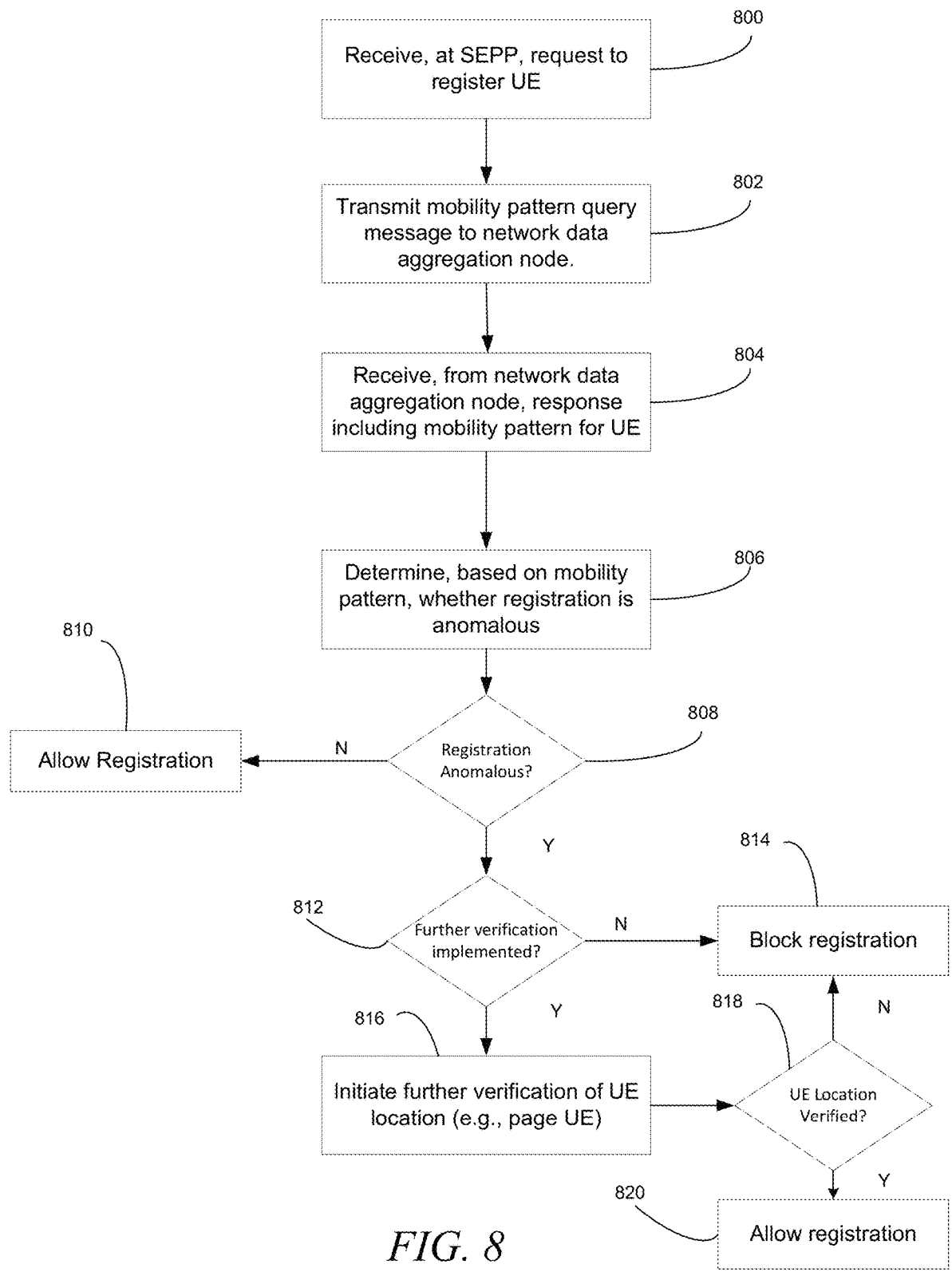
FIG. 8 is a flow chart illustrating exemplary process performed by an SEPP in obtaining mobility patterns from an aggregation node and screening UE registrations based on the mobility patterns.

FIG. 8 is a flow chart illustrating an exemplary process performed by a home network SEPP and performing security screening based on mobility pattern information. Referring to FIG. 8, in step 800, the SEPP receives a request to register a UE. For example, SEPP 126A may receive a registration request for a legitimate UE or a fake registration from an attacker.

In step 802, in response to the registration request, the SEPP transmits a mobility pattern query message to the network data aggregation node. For example, SEPP 126A may transmit a mobility pattern query message to aggregation node 300. The mobility pattern query message may identify the UE whose registration is being requested and optionally the location for which the registration is requested. The location may be provided for the case where aggregation node 300 makes a determination as to whether the registration is anomalous. If the determination is made solely by SEPP 126A, then sending the location of the UE as part of the mobility pattern query is not required. SEPP 126A may cache and refrain from forwarding the registration request to the UDM in the home network while the determination as to whether the registration request is anomalous is being made.

In step 804, the SEPP 126A receives, from the network data aggregation node, a response, including the mobility pattern for the UE. For example, SEPP 126A may receive mobility pattern information, such as that illustrated above in Tables 1-4, from aggregation node 300. The mobility pattern information may indicate a historical pattern of registrations for the UE identified in the request. The mobility pattern may additionally or alternatively indicate a mobility pattern for UEs of the same device type as the UE identified in the mobility pattern request. Mobility patterns for UEs of the same device type may be useful in determining whether a registration for a particular UE, such as an IoT device, is anomalous, when compared with mobility patterns of other UEs of the same device type. For example, one would expect a registration for a mobile handset with voice call capabilities to have different ranges of values for various parameters in the registration request than a registration from an IoT device where the IoT device is a sensor. Another check for an IoT device could be to determine whether the device type is mobile. For example, a stationary IoT device may be expected to always register from the same location when the device wakes up to send its data. A registration for the same stationary IoT device for network locations may indicate that the registration is anomalous.

In step 806, SEPP 126A determines, based on the mobility pattern, whether the registration is anomalous. For example, SEPP 126A may identify the registration as being anomalous if the location of the registration indicates a location in a network where the UE has never been registered in the past. In another example, SEPP 126A may implement a more sophisticated algorithm, such as a machine learning algorithm, to determine whether a UE registration is anomalous.

In step 808, if the registration is not determined to be anomalous, control proceeds to step 810 where the registration is allowed. If the registration is allowed, SEPP 126A will forward the registration request to the UDM in the home network of the UE. The UDM will update the UE's location in its database, and subsequent communications to the UE will be sent to that location until the registration is canceled or updated by a new registration.

If the registration is determined to be anomalous, as indicated above, in some instances, the SEPP may implement further verification to determine whether to allow the registration. For example, if the UE is a mobile telephone that is registering for the first time in a new city, the registration may be valid if the user has traveled to that city for the first time. Accordingly, in step 812, it is determined whether further verification of the registration is implemented. If further verification is not implemented, control proceeds to step 814 where the SEPP blocks the registration. Blocking the registration may include refraining from forwarding the registration to the UDM, and, optionally responding to the requesting node (real AMF or attacker).

In step 812, if further verification is implemented control proceeds to step 816 where further verification of the UE's registration is performed. In one example, SEPP 126A may initiate paging of the UE. Initiating paging of the UE may include sending a paging request message to the UE via the network location identified in the registration request. The paging response will be sent back to the requesting SEPP 126A. If the paging response indicates that the UE was successfully paged, this is an indication that there is a real UE at the location specified in the registration request.

Accordingly, in step 818, if the UE location is verified, control proceeds to step 820 where the registration is allowed. If the SEPP 126A receives a response indicating that the paging was unsuccessful, this is an indication that there is not a real UE at the location specified in the registration request and that the registration is fake. Accordingly, if the UE location is not verified by receiving a response indicating successful paging of the UE, control proceeds to step. 814 where the registration is blocked.

It should be noted that subject matter described herein is not limited to blocking UE registrations that are identified as anomalous. In addition to or instead of blocking the registrations, SEPP 126A may notify the network operator by transmitting a message to an operations, administration, and maintenance (OA&M) system of the network operator. In the case where a registration is identified as anomalous but is allowed, the network operator may choose to block subsequent registrations that identify the same UE if it is determined after further analysis that the registrations are fake.

The subject matter described herein is not limited to identifying a UE registration as anomalous based on a comparison of the historical mobility pattern for the same UE. In an alternate implementation, network data aggregation node 300 may collect UE registration data for UEs of the same type and provide, to a requesting node, the UE registration data for the UEs of the same type as a UE attempting to register. In such a case, the requesting node, such as home network SEPP 126A will compare the registration data of the UE attempting to register with UE mobility pattern(s) of UEs of the same type as the UE requesting to register. If the registration data of the UE attempting to register is statistically different from the mobility patterns of the UEs of the same type, the UE registration may be blocked. If the registration data of the UE attempting to register is not statistically similar to the mobility patterns of the UEs of the same type, the registration may be blocked.

Figure 9:
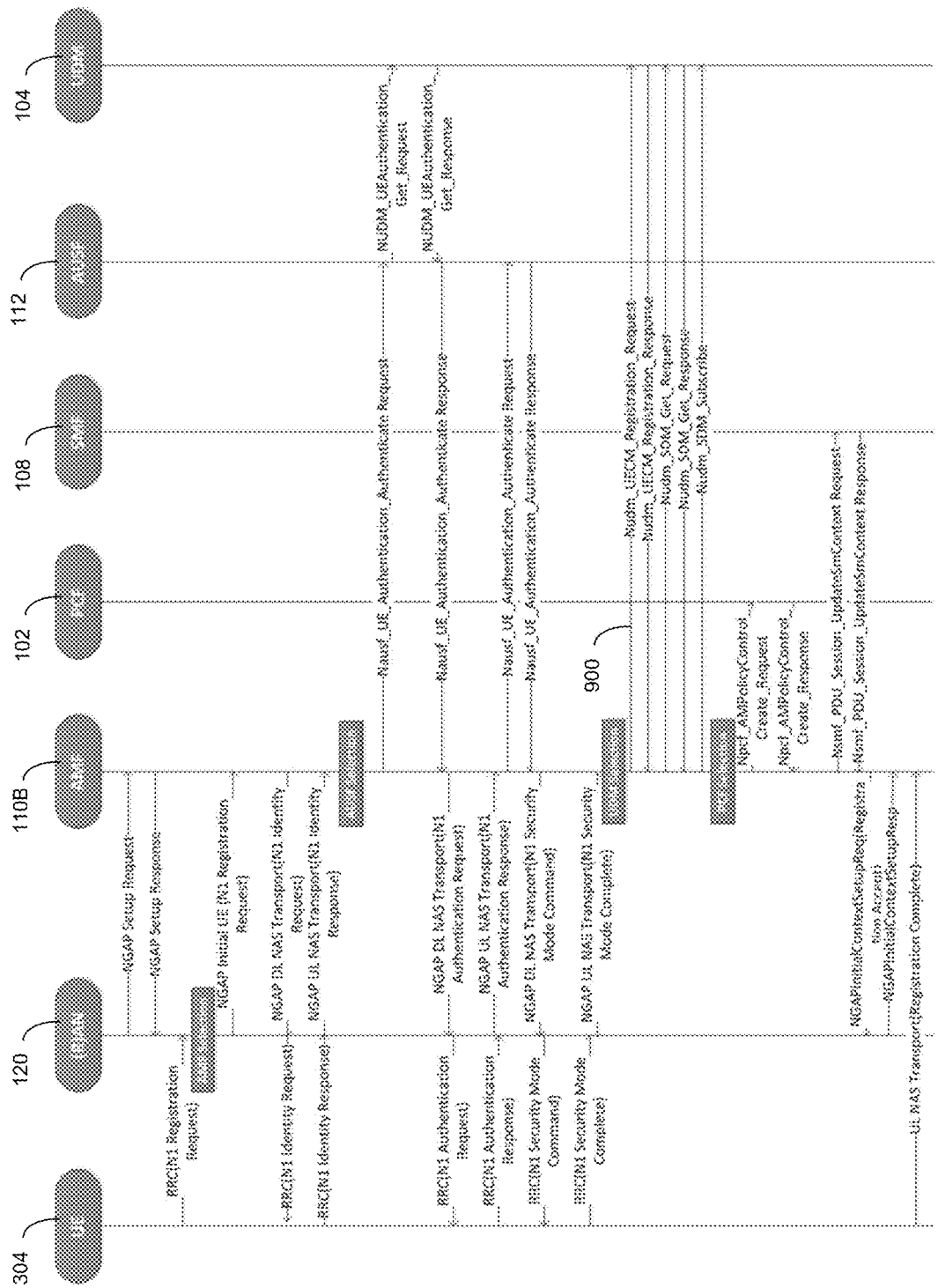
FIG. 9 is a signaling message flow diagram illustrating exemplary signaling associated with 5G mobility.

As stated above, the network data aggregation node 300 is configured to perform 5G historical mobility tracking using signaling messages exchanged between 5G network nodes to support 5G UE mobility. FIG. 9 is a signaling message flow diagram illustrating exemplary 5G messages associated with mobility of a UE. Referring to FIG. 9, when UE 304 connects to the network via RAN 120, RAN 120 performs AMF selection and sends a registration request message to serving AMF 110. Serving AMF 110B performs AUSF selection and signals with AUSF 112 in the home network of the UE to authenticate the UE. Once the UE is authenticated, serving AMF sends an Nudm_UECM_Registration_Request message 900 to UDM 104 located in the home network of UE 304. The message may be sent via an SEPP (not shown in FIG. 9) in the network of AMF 110B. Serving AMF 110B may send a copy of the registration data from Nudm_UECM_Registration_Request message 900 to network data aggregation node 300, and network data aggregation node 900 may store the registration data in UE mobility pattern database 606. The home network SEPP (not shown in FIG. 9) may query the UE mobility pattern database to determine whether to allow Nudm_UECM_Registration_Request message 900 to be sent to UDM 104 to register the user. The remaining signaling in FIG. 9 relates to policy control and session setup for the UE once the UE's registration is allowed to proceed with the UDM. If the registration is blocked, the remaining signaling after the registration is avoided.

Figure 10:
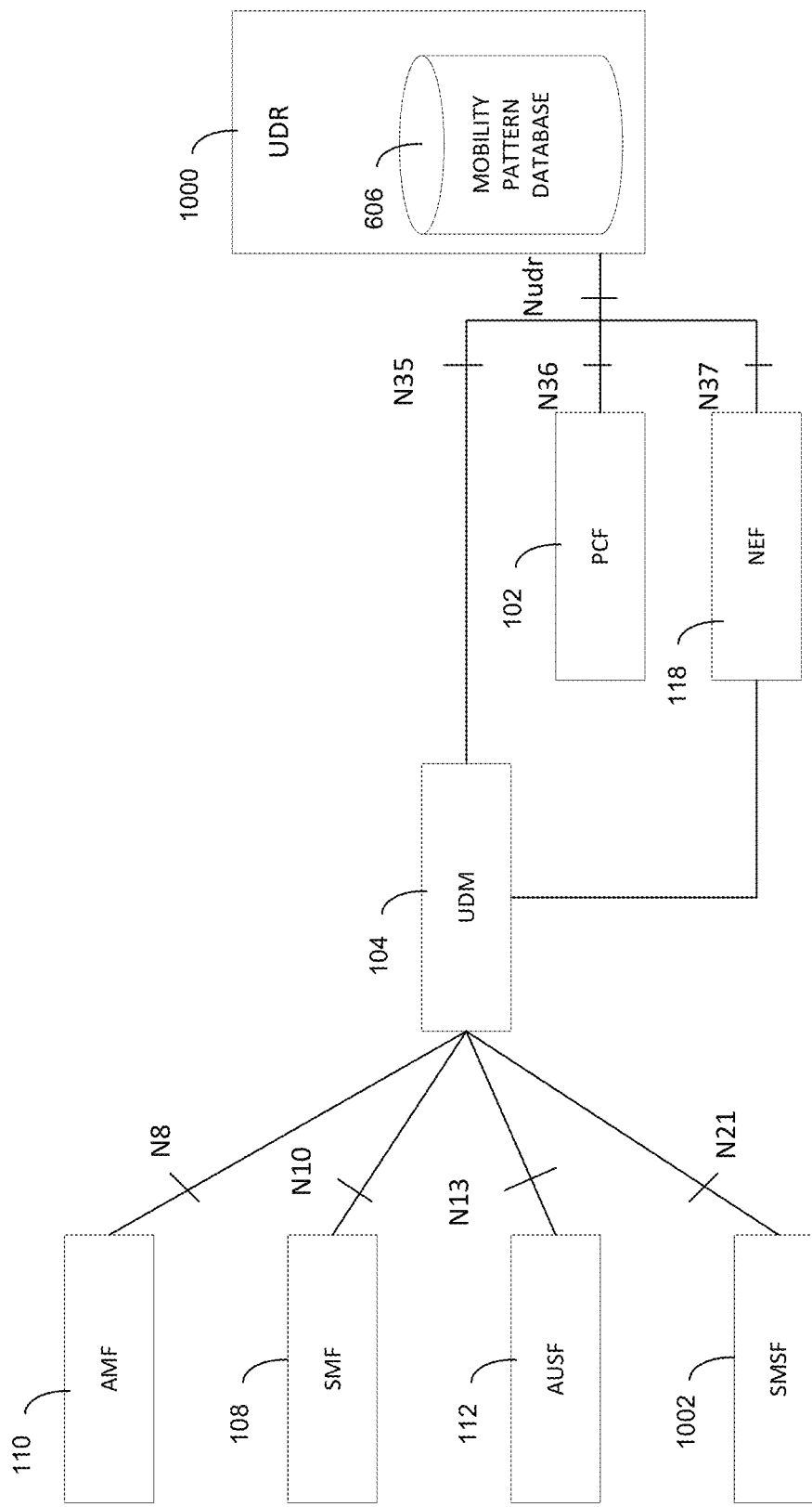
FIG. 10 is a network diagram illustrating an exemplary unified data repository (UDR) for performing 5G mobility tracking according to an aspect of the subject matter described herein.

In the examples above, aggregation node 300 is described as being implemented using an NWDAF or a non-3GPP defined aggregation platform. In another example, aggregation node 300 can be implemented using a 5G UDR. FIG. 10 is a network diagram illustrating a 5G UDR and its interfaces with other 5G network nodes. In FIG. 10, UDR 1000 stores subscription data, policy data, structured data for exposure, and application data. This data can be collected from UDM 104, PCF 102, and NEF 118. The interfaces between UDM 104 and AMF 110, SMF 108, AUSF 112, and short message service function (SMSF) 1002 are also illustrated.

If UDR 1000 implements the functionality of aggregation node 300 described above, UDR 1000 may utilize UE registration data obtained from UDM 104 to populate mobility pattern database 606. In addition, UDR 1000 may utilize the data in mobility pattern database 606 to respond to mobility pattern queries, as described above.

Thus, using historical UE registration information to generate mobility patterns and using the mobility patterns to screen UE registrations, some network attacks can be avoided and data integrity in the home network is enhanced. Using mobility patterns is more computationally efficient than computing distances between networks and using the distances to perform velocity checks.

Implementing the mobility pattern generation at a network data aggregation platform, such as an NWDAF, UDR, or non-3GPP data aggregation platform, is advantageous because such an implementation offloads the storage, processing and retrieval required to generate the mobility patterns from nodes, such as AMFs, that are also responsible for establishing and maintaining sessions between UEs. Implementing security screening at the home network SEPP is advantageous because the SEPP is located at a natural ingress and egress point of the network.

Even though in the examples described above the mobility patterns are generated by the network data aggregation node and the determination as to whether a registration is anomalous is made by the SEPP, the subject matter described herein is not limited to such an implementation. In an alternate implementation, the mobility pattern generation and determination as to whether a registration is anomalous may be performed by the network data aggregation node. In such an implementation, the message flow may be the same as that illustrated in FIG. 3 except the response from the network data aggregation node to the mobility pattern query may include a determination as to whether the registration is anomalous or not. Upon receiving the response with the determination, the SEPP may 1) accept the determination, 2) perform UE location verification as described above and accept or overturn the determination based on results of the verification. That is, if the determination made by the network data aggregation node is that a registration is anomalous, but the UE's location is verified by a successful paging of the UE, the SEPP may record the determination made by the network data aggregation node, record that the UE was successfully paged, and allow the registration to proceed into the home network of the UE. If the determination made by the network data aggregation node is that a registration is anomalous, and the UE is not successfully paged, the SEPP may block the registration. If the determination by the network data aggregation function is that the registration is not anomalous, the SEPP may allow the registration or only allow the registration after successful verification of the UE location though successful paging.

The disclosure of each of the following references is hereby incorporated herein by reference in its entirety:

REFERENCES 1. 3GPP TS 23.501; $3^{rd}$ Generation Partnership Project; Technical Specification Group Services and System Aspects; System architecture for the 5G System (5GS); Stage 2 (Release 16) V16.4.0 (2020 March)
2. 3GPP TS 23.502; $3^{rd}$ Generation Partnership Project; Technical Specification Group Services and System Aspects; Procedures for the 5G System (5GS); Stage 2 (Release 16) (2020 March) V16.4.0 (2020 March)
3. 3GPP TS 29.510; $3^{rd}$ Generation Partnership Project; Technical Specification Group Core Network and Terminals; 5G System; Network Function Repository Services; Stage 3 (Release 16), V16.4.0 (2020 July)
4. 3GPP TS 29.500; $3^{rd}$ Generation Partnership Project; Technical Specification Group Core Network and Terminals; 5G System; Technical Realization of Service Based Architecture; Stage 3 (Release 16), V16.4.0 (2020 June)
5. 3GPP TS 29.520, $3^{rd}$ Generation Partnership Project, Technical Specification Group Core Network and Terminals; 5G System; Network Data Analytics Services; Stage 3 (Release 16), V16.4.0 (2020 June)

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for historical 5G user equipment (UE) mobility tracking and security screening, the method comprising:
  receiving, at a network data aggregation node including at least one processor, UE registration data from 5G network functions (NFs) as UEs connect to different network locations;
  aggregating, at the network node, registration data for individual UEs to produce mobility patterns for the UEs, wherein aggregating the registration data to generate the mobility patterns comprises storing, for each mobility pattern, an indicator of location of a UE, a timestamp of when the UE registered at the location, and a type allocation code (TAC) for each instance of registration of the UE;
  receiving, at the network node and from a 5G NF located in a home network of a UE, a request for the mobility pattern of the UE in response to receiving a message for effecting a new registration for the UE;
  responding to the request by transmitting the mobility pattern to the 5G NF located in the home network of the UE, wherein the 5G NF located in the home network of the UE comprises a security edge protection proxy (SEPP) and further comprising, at the SEPP, receiving the mobility pattern and determining, based on the mobility pattern, that the message for effecting the new registration indicates a UE registration pattern anomaly, wherein determining that the message for effecting the new registration indicates a UE registration pattern anomaly comprises:
    determining a device type from the TAC;
    comparing the mobility pattern to mobility patterns of devices of the same or similar type as the UE; and
    determining that the registration is anomalous based on results of the comparison; and
  at the SEPP, in response to determining that the message for effecting the new registration indicates a UE registration pattern anomaly, blocking the message for effecting the new registration.

2. The method of claim 1 wherein receiving the UE registration data includes receiving a mobility pattern from at least one of the 5G NFs.

3. The method of claim 1 wherein the network data aggregation node comprises a network data analytics platform (NWDAF) or a unified data repository (UDR).

4. The method of claim 1 wherein the network data aggregation node comprises a non-3GPP defined network data aggregation platform.

5. The method of claim 1 wherein the UE comprises an Internet of things (IoT) device.

6. A system for historical 5G user equipment (UE) mobility tracking and security screening, the system comprising:
  a network data aggregation node including at least one processor; and
  5G UE mobility pattern generator for receiving registration data from 5G network functions (NFs) as UEs connect to different network locations, aggregating registration data for individual UEs to produce mobility patterns for the UEs, wherein aggregating the registration data to generate the mobility patterns comprises storing, for each mobility pattern, an indicator of location of a UE, a timestamp of when the UE registered at the location, and a type allocation code (TAC) for each instance of registration of the UE, wherein the 5G UE mobility pattern generator is configured for receiving, from a 5G NF located in a home network of a UE, a request for a mobility pattern of the UE in response to receiving a message for effecting a new registration for the UE, and responding to the request by transmitting the mobility pattern to the home network of the UE, wherein the 5G NF located in the home network of the UE comprises a security edge protection proxy (SEPP) and the SEPP is configured to:
  receive the mobility pattern;
  determining, based on the mobility pattern, that the message for effecting the new registration indicates a UE registration pattern anomaly, wherein determining that the message for effecting the new registration indicates a UE registration pattern anomaly comprises determining a device type from the TAC, comparing the mobility pattern to mobility patterns of devices of the same or similar type as the UE, and determining that the registration is anomalous based on results of the comparison; and
  in response to determining that the message for effecting the new registration indicates a UE registration pattern anomaly, block the message for effecting the new registration.

7. The system of claim 6 wherein receiving the UE registration data includes receiving a mobility pattern for the UE from at least one of the 5G NFs.

8. The system of claim 6 wherein the network data aggregation node comprises a network data analytics platform (NWDAF) or a unified data repository (UDR).

9. The system of claim 6 wherein the network data aggregation node comprises a non-3GPP defined network data aggregation platform.

10. A non-transitory computer readable medium having stored thereon executable instructions that when executed by a processor of a computer control the computer to perform steps comprising:

receiving, at a network data aggregation node including at least one processor, UE registration data from 5G network functions (NFs) as UEs connect to different network locations;

aggregating, at the network node, registration data for individual UEs from the 5G NFs to produce mobility patterns for the UEs, wherein aggregating the registration data to generate the mobility patterns comprises storing, for each mobility pattern, an indicator of location of a UE, a timestamp of when the UE registered at the location, and a type allocation code (TAC) for each instance of registration of the UE;

receiving, at the network node and from a 5G NF located in a home network of a UE, a request for the mobility pattern of the UE in response to receiving a message for effecting a new registration for the UE; and responding to the request by transmitting the mobility pattern to the 5G NF located in the home network of the UE, wherein the 5G NF located in the home network of the UE comprises a security edge protection proxy (SEPP) and further comprising, at the SEPP, receiving the mobility pattern and determining, based on the mobility pattern, that the message for effecting the new registration indicates a UE registration pattern anomaly, wherein determining that the message for effecting the new registration indicates a UE registration pattern anomaly comprises:

determining a device type from the TAC;

comparing the mobility pattern to mobility patterns of devices of the same or similar type as the UE; and determining that the registration is anomalous based on results of the comparison; and at the SEPP, in response to determining that the message for effecting the new registration indicates a UE registration pattern anomaly, blocking the message for effecting the new registration.

* * * * *

UNITED STATES PATENT AND TRADEMARK OFFICE
CERTIFICATE OF CORRECTION

| | | Page 1 of 1 |
|---|---|---|
| PATENT NO. | : 11,751,056 B2 | |
| APPLICATION NO. | : 17/008528 | |
| DATED | : September 5, 2023 | |
| INVENTOR(S) | : Travis Earl Russell | |

It is certified that error appears in the above-identified patent and that said Letters Patent is hereby corrected as shown below:

In the Specification

In Column 2, Line 48, replace "platform" with "function".

In Column 4, Line 5, replace "user" with "unified".

In Column 10, Line 1, delete "of the" (second occurrence).

In Column 11, Line 6, replace "by," with "by".

In the Claims

In Column 16, Claim 3, Lines 22-23, replace "platform" with "function".

Column 17, Claim 8, Lines 5-6, replace "platform" with "function".

Signed and Sealed this
Fifteenth Day of April, 2025

Coke Morgan Stewart
*Acting Director of the United States Patent and Trademark Office*